US012628029B2

(12) United States Patent
Yang et al.

(10) Patent No.: US 12,628,029 B2
(45) Date of Patent: May 12, 2026

(54) DYNAMIC BANDWIDTH ALLOCATION AND JITTER HANDLING IN MULTI-TIERED SATELLITE NETWORKS

(71) Applicant: Hughes Network Systems, LLC, Germantown, MD (US)

(72) Inventors: Xuehong Yang, Rockville, MD (US); Fernando Secali De Oliveira Filho, Germantown, MD (US); Yuanlai Zhou, Germantown, MD (US); Yeqing Tang, Gaithersburg, MD (US); Venkatasubramaniam Ganesan, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 318 days.

(21) Appl. No.: 18/400,752

(22) Filed: Dec. 29, 2023

(65) Prior Publication Data

US 2025/0220492 A1     Jul. 3, 2025

(51) Int. Cl.
| | |
|---|---|
| *H04W 28/02* | (2009.01) |
| *H04W 28/086* | (2023.01) |
| *H04W 28/20* | (2009.01) |

(52) U.S. Cl.
CPC ...  *H04W 28/0236* (2013.01); *H04W 28/0864* (2023.05); *H04W 28/20* (2013.01)

(58) Field of Classification Search
CPC ......... H04W 28/0236; H04W 28/0864; H04W 28/20
See application file for complete search history.

(56) References Cited

U.S. PATENT DOCUMENTS

| | | |
|---|---|---|
| 10,200,250 B2 | 2/2019 | Roy et al. |
| 10,367,578 B2 | 7/2019 | Xu et al. |

(Continued)

OTHER PUBLICATIONS

"QOS Provisioning in GEO Satellite With Onboard Processing Using Predictor Algorithms"; Chiti et al.; IEEE Wireless Communications •Oct. 2005 (Year: 2005).*

(Continued)

*Primary Examiner* — Benjamin H Elliott, IV
(74) *Attorney, Agent, or Firm* — Mannava & Kang, P.C.

(57) ABSTRACT

Systems and methods for dynamic bandwidth allocation and jitter handling in multi-tiered satellite networks such as virtual communication networks and/or physical communication networks. The system includes bandwidth distributing (BD) unit, in-route group managers (IGMs), in-route bandwidth manager (IBM). The system functions in multi-tier network entity management mode, and multi-beam management mode. The system operates by periodically collecting bandwidth reports from IGMs. The BD unit analyzes data in report and compares aggregated bandwidth demand with pre-defined thresholds. If thresholds are exceeded, system switches to multi-tier network entity management mode. In this mode, BD unit determines individual bandwidth adjustments for virtual network and beams and allocates bandwidth for individual devices within virtual network. Further, BD unit transmits this information to IBM, which applies allocations, and receives and transmits a scaling factor back to IGM indicating utilization of allocated bandwidth. Further, BD unit switches back to multi-beam management mode based on comparison result.

20 Claims, 10 Drawing Sheets

(56) References Cited

U.S. PATENT DOCUMENTS

| | | | | |
|---|---|---|---|---|
| 2013/0136004 A1* | 5/2013 | Torres | ............... | H04B 7/18582 |
| | | | | 370/236 |
| 2016/0072691 A1* | 3/2016 | Xu | ..................... | H04B 7/18578 |
| | | | | 370/252 |
| 2018/0152351 A1* | 5/2018 | Roy | ..................... | H04L 41/042 |
| 2019/0013860 A1* | 1/2019 | Xu | ..................... | H04B 7/18578 |
| 2021/0204300 A1* | 7/2021 | Hu | ..................... | H04B 7/18513 |
| 2022/0140891 A1* | 5/2022 | Roy | .................. | H04B 7/18515 |
| | | | | 370/316 |
| 2022/0376776 A1* | 11/2022 | Roy | ..................... | H04W 76/30 |
| 2025/0220492 A1* | 7/2025 | Yang | ..................... | H04W 28/20 |

OTHER PUBLICATIONS

PCT. "International Search Report and Written Opinion for Application PCT/US2024/058286", dated Jan. 23, 2026, 10 pages.

* cited by examiner

100

102

500

600C

700

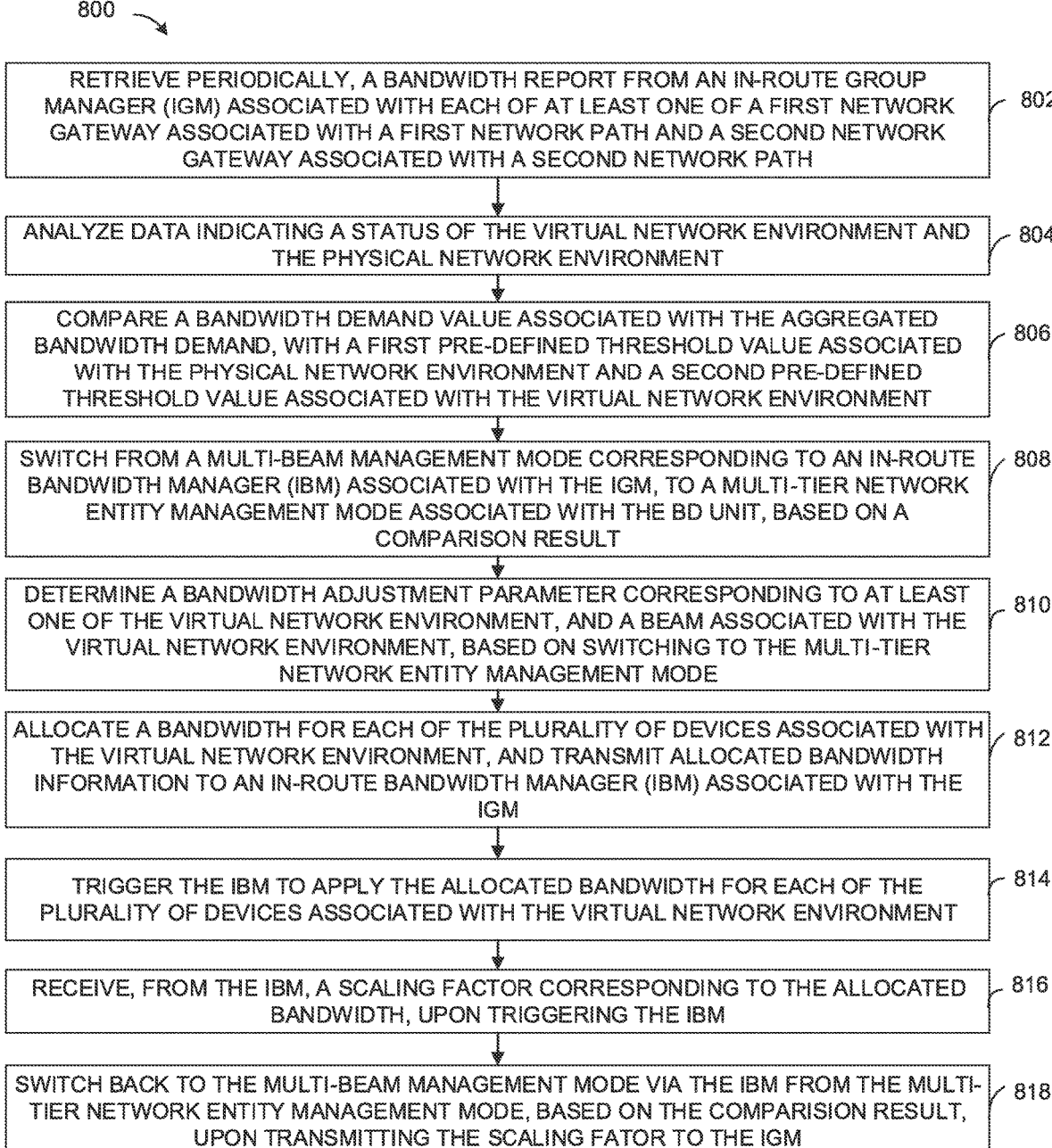

800

RETRIEVE PERIODICALLY, A BANDWIDTH REPORT FROM AN IN-ROUTE GROUP MANAGER (IGM) ASSOCIATED WITH EACH OF AT LEAST ONE OF A FIRST NETWORK GATEWAY ASSOCIATED WITH A FIRST NETWORK PATH AND A SECOND NETWORK GATEWAY ASSOCIATED WITH A SECOND NETWORK PATH — 802

ANALYZE DATA INDICATING A STATUS OF THE VIRTUAL NETWORK ENVIRONMENT AND THE PHYSICAL NETWORK ENVIRONMENT — 804

COMPARE A BANDWIDTH DEMAND VALUE ASSOCIATED WITH THE AGGREGATED BANDWIDTH DEMAND, WITH A FIRST PRE-DEFINED THRESHOLD VALUE ASSOCIATED WITH THE PHYSICAL NETWORK ENVIRONMENT AND A SECOND PRE-DEFINED THRESHOLD VALUE ASSOCIATED WITH THE VIRTUAL NETWORK ENVIRONMENT — 806

SWITCH FROM A MULTI-BEAM MANAGEMENT MODE CORRESPONDING TO AN IN-ROUTE BANDWIDTH MANAGER (IBM) ASSOCIATED WITH THE IGM, TO A MULTI-TIER NETWORK ENTITY MANAGEMENT MODE ASSOCIATED WITH THE BD UNIT, BASED ON A COMPARISON RESULT — 808

DETERMINE A BANDWIDTH ADJUSTMENT PARAMETER CORRESPONDING TO AT LEAST ONE OF THE VIRTUAL NETWORK ENVIRONMENT, AND A BEAM ASSOCIATED WITH THE VIRTUAL NETWORK ENVIRONMENT, BASED ON SWITCHING TO THE MULTI-TIER NETWORK ENTITY MANAGEMENT MODE — 810

ALLOCATE A BANDWIDTH FOR EACH OF THE PLURALITY OF DEVICES ASSOCIATED WITH THE VIRTUAL NETWORK ENVIRONMENT, AND TRANSMIT ALLOCATED BANDWIDTH INFORMATION TO AN IN-ROUTE BANDWIDTH MANAGER (IBM) ASSOCIATED WITH THE IGM — 812

TRIGGER THE IBM TO APPLY THE ALLOCATED BANDWIDTH FOR EACH OF THE PLURALITY OF DEVICES ASSOCIATED WITH THE VIRTUAL NETWORK ENVIRONMENT — 814

RECEIVE, FROM THE IBM, A SCALING FACTOR CORRESPONDING TO THE ALLOCATED BANDWIDTH, UPON TRIGGERING THE IBM — 816

SWITCH BACK TO THE MULTI-BEAM MANAGEMENT MODE VIA THE IBM FROM THE MULTI-TIER NETWORK ENTITY MANAGEMENT MODE, BASED ON THE COMPARISION RESULT, UPON TRANSMITTING THE SCALING FATOR TO THE IGM — 818

FIG. 8

DYNAMIC BANDWIDTH ALLOCATION AND JITTER HANDLING IN MULTI-TIERED SATELLITE NETWORKS

TECHNICAL FIELD

This patent application is directed to satellite communication systems and, more specifically, to systems and methods for dynamic bandwidth allocation and jitter handling in multi-tiered satellite networks such as virtual communication networks and/or physical communication networks.

BACKGROUND

Generally, satellite communication networks are evolving towards greater complexity, with a plurality of service providers offering different levels of service to a diverse range of customers. In a multi-tiered service agreement, a network operator may enter into a service level agreement (SLA) with a service provider that procures bulk access to infrastructure of a network operator. In turn, the service provider may enter into agreements with various entities that desire to obtain access to the network via the service provider. Such a hierarchical arrangement can be complicated to manage, especially because each of the various service providers and the entities may desire different levels of service. The entities may include entities that either subdivide their allocated uplink and downlink throughput among additional entities or provide such uplink and downlink throughput to satellite terminals. For example, network service providers (NSP) and virtual network operators (VNOs) represent types of entities, which provide service to end users. It should be understood that the terms NSP and VNO are arbitrary and are merely used herein to distinguish between entities that are part of a multi-tier of satellite network provider. One challenge in managing such multi-tiered networks is ensuring efficient and equitable bandwidth allocation. Different entities may have different bandwidth requirements and priorities, and it can be difficult to balance these needs while also ensuring that the network remains stable and reliable.

Several bandwidth flow control mechanisms have been implemented for parallel use in multi-tiered satellite networks. Once such bandwidth flow control mechanism may involve use of an in-route group managers (IGMs) and an in-route bandwidth manager (IBM). Communications sent from a satellite terminal are referred to as in-route transmissions, and communications received by a satellite terminal are referred as out-route transmissions. In a scenario, the IGM may monitor bandwidth statistics of each entity under respective management policy and report the bandwidth statistics to IBM. The IBM then allocates bandwidth to each entity based on various factors, such as respective reported usage, maximum subscription, and overall available bandwidth in the network. Additionally, the IGMs also allocate bandwidth to each entity based on the various factors. Another such bandwidth flow control mechanism may include multi-tier NSP/VNO bandwidth sharing techniques. This technique may manage bandwidth at different levels, such as an NSP/beam level, a VNO system-wide level, and a NSP system-wide level. This ensures that each NSP and VNO remains within their allocated bandwidth limits, and any unused bandwidth can be redistributed by the IBM.

Though existing bandwidth flow control mechanisms may effectively manage bandwidth consumption, the existing mechanisms may also introduce jitter into the network. The jitter occurs when the total requested bandwidth for a particular entity exceeds respective allocated limits, and the IBM may not adjust the bandwidth allocation immediately. When any of the limits are exceeded, the IBM may adjust the bandwidth allocation to ensure that each entity and beam remains within assigned bandwidth quota. However, the adjustment process may be disruptive and lead to fluctuations in the available bandwidth, which may negatively impact the performance of applications and services that rely on consistent bandwidth. Additionally, the problem of jitter can be exacerbated if the bandwidth adjustment mechanism does not apply to the IBM itself. In such cases, the entity or the beam may be able to achieve respective configured maximum bandwidth limit, even if the entity or the beam exceeds allocated quota. This can result in drastic fluctuations in the available bandwidth, causing significant jitter and impacting network performance and user experience.

Consequently, there may be a need in the art to provide improved systems and methods for dynamic bandwidth allocation and jitter handling in multi-tiered satellite networks such as virtual communication networks and/or physical communication networks, and to address at least the aforementioned issues. Such systems and method may need to be able to efficiently and equitably allocate bandwidth while also reducing jitter and ensuring high network performance.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a system for dynamic bandwidth allocation and jitter handling in multi-tiered satellite networks. The system includes a first network path comprising a physical network environment. The physical network environment includes a first network gateway associated with the first network path. Further, the system includes a second network path comprising a virtual network environment. The virtual network environment includes a second network gateway associated with the second network path. Additionally, the system includes a bandwidth distributing (BD) unit communicatively coupled to at least one of the first network gateway and the second network gateway. The BD unit includes a multi-tier network entity management mode. Further, the BD unit retrieves, periodically, a bandwidth report from an in-route group manager (IGM) (i.e., an in-route bandwidth manager (IBM) may retrieve the bandwidth report from the IGM and then the IBM may transmit the bandwidth report to the BD unit) associated with each of at least one of the first network gateway and the second network gateway. The bandwidth report includes a request, from a plurality of devices, for bandwidth on at least one of the physical network environment and the virtual network environment. Furthermore, the BD unit analyzes data indicating a status of the virtual network environment and the physical network environment. The status corresponds to an aggregated bandwidth demand for the virtual network environment and the physical network environment. Additionally, the BD unit compares a bandwidth demand value associated with the aggregated bandwidth demand, with a first pre-defined threshold value associated with the physical network environment and a second pre-defined threshold value associated with the virtual network environment. Further, the BD unit switches from, a multi-beam management mode corresponding to an in-route bandwidth manager (IBM) associated with the IGM, to the multi-tier network entity management mode, based on a comparison result.

Further, the BD unit determines a bandwidth adjustment parameter corresponding to at least one of the virtual network environment, and a beam associated with the virtual network environment, based on the switching the mode. The bandwidth adjustment parameter is determined for the virtual network environment within at least one of the physical network environment and the virtual network environment. Furthermore, the BD unit allocates a bandwidth for each of the plurality of devices associated with the virtual network environment and transmits allocated bandwidth information to an in-route bandwidth manager (IBM) associated with the IGM. Additionally, the BD unit triggers the IBM to apply the allocated bandwidth for each of the plurality of devices associated with the virtual network environment. Further, the BD unit receives, from the IBM, a scaling factor corresponding to the allocated bandwidth, upon triggering the IBM (i.e., the scaling factor is calculated by the IBM and then the scaling factor is transmitted to the IGM. The BD unit may not use the scaling factor). The received scaling factor is transmitted to the IGM. Additionally, the BD unit switches back to the multi-beam management mode via the IBM from the multi-tier network entity management mode, based on the comparison result, upon transmitting the scaling factor to the IGM.

Another aspect of the present disclosure provides a method for dynamic bandwidth allocation and jitter handling in multi-tiered satellite networks. The method includes retrieving periodically, a bandwidth report from an in-route group manager (IGM) associated with each of at least one of a first network gateway associated with a first network path and a second network gateway associated with a second network path. The bandwidth report includes a request, from a plurality of devices, for bandwidth on at least one of a physical network environment associated with the first network path and a virtual network environment associated with the second network path. The BD unit is communicatively coupled to at least one of the first network gateway and the second network gateway. Further, the method includes analyzing data indicating a status of the virtual network environment and the physical network environment. The status corresponds to an aggregated bandwidth demand for the virtual network environment and the physical network environment. Further, the method includes comparing a bandwidth demand value associated with the aggregated bandwidth demand, with a first pre-defined threshold value associated with the physical network environment and a second pre-defined threshold value associated with the virtual network environment. Additionally, the method includes switching from a multi-beam management mode corresponding to an in-route bandwidth manager (IBM) associated with the IGM, to a multi-tier network entity management mode associated with the BD unit, based on a comparison result. Further, the method includes determining a bandwidth adjustment parameter corresponding to at least one of the virtual network environment, and a beam associated with the virtual network environment, based on the switching the mode. The bandwidth adjustment parameter is determined for the virtual network environment within at least one of the physical network environment and the virtual network environment.

Further, the method includes allocating a bandwidth for each of the plurality of devices associated with the virtual network environment and transmitting allocated bandwidth information to an in-route bandwidth manager (IBM) associated with the IGM. Furthermore, the method includes triggering the IBM to apply the allocated bandwidth for each of the plurality of devices associated with the virtual network environment. Additionally, the method includes receiving from the IBM, a scaling factor corresponding to the allocated bandwidth, upon triggering the IBM, wherein the received scaling factor is transmitted to the IGM. Further, the method includes switching back to the multi-beam management mode via the IBM from the multi-tier network entity management mode, based on the comparison result, upon transmitting the scaling factor.

Yet another aspect of the present disclosure provides a non-transitory computer-readable medium comprising machine-readable instructions. That are executable by a processor to retrieve, periodically, a bandwidth report from an in-route group manager (IGM) associated with each of at least one of the first network gateway and the second network gateway. The bandwidth report includes a request, from a plurality of devices, for bandwidth on at least one of the physical network environment and the virtual network environment. Furthermore, the processor analyzes data indicating a status of the virtual network environment and the physical network environment. The status corresponds to an aggregated bandwidth demand for the virtual network environment and the physical network environment. Additionally, the processor compares a bandwidth demand value associated with the aggregated bandwidth demand, with a first pre-defined threshold value associated with the physical network environment and a second pre-defined threshold value associated with the virtual network environment. Further, the processor switches from, a multi-beam management mode corresponding to an in-route bandwidth manager (IBM) associated with the IGM, to the multi-tier network entity management mode, based on a comparison result.

Further, the processor determines a bandwidth adjustment parameter corresponding to at least one of the virtual network environment, and a beam associated with the virtual network environment, based on the switching the mode. The bandwidth adjustment parameter is determined for the virtual network environment within at least one of the physical network environment and the virtual network environment. Furthermore, the processor allocates a bandwidth for each of the plurality of devices associated with the virtual network environment and transmits allocated bandwidth information to an in-route bandwidth manager (IBM) associated with the IGM. Additionally, the processor triggers the IBM to apply the allocated bandwidth for each of the plurality of devices associated with the virtual network environment. Further, the processor receives, from the IBM, a scaling factor corresponding to the allocated bandwidth, upon triggering the IBM. The received scaling factor is transmitted to the IGM. Additionally, the processor switches back to the multi-beam management mode via the IBM from, the multi-tier network entity management mode, based on the comparison result, upon transmitting the scaling factor to the IGM.

To further clarify the features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

Features of the disclosed embodiments are illustrated by way of example and not limited in the following Figure(s), in which like numerals indicate like elements, in which:

FIG. 8 illustrates a flow diagram representation of a method for dynamic bandwidth allocation and jitter handling in multi-tiered satellite networks, according to an example.

Figure 1:
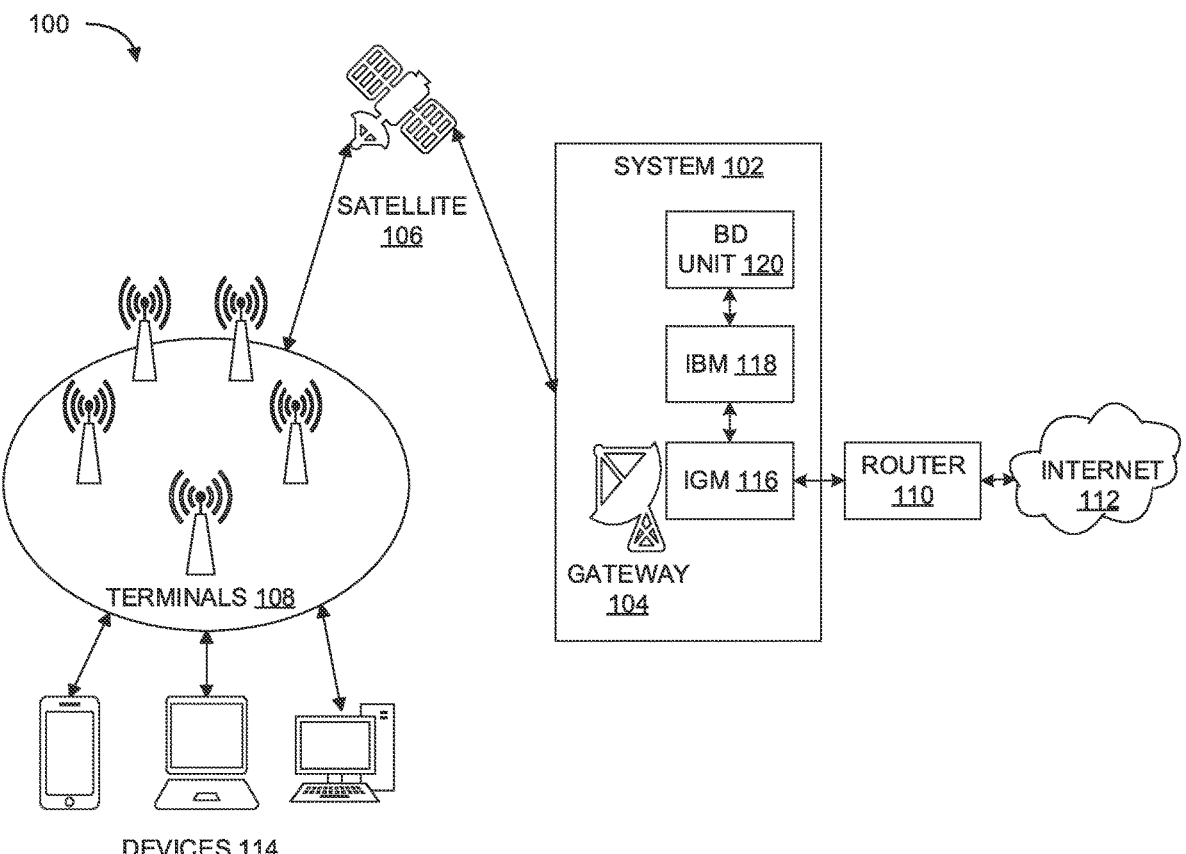
FIG. 1 illustrates a block diagram representation of a network architecture for a system for a dynamic bandwidth allocation and jitter handling in multi-tiered satellite networks, according to an example.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the examples of the present disclosure so as not to obscure the figures with details that will be readily apparent to those skilled in the art having the benefit of the description herein.

DETAILED DESCRIPTION

For simplicity and illustrative purposes, the proposed approach and solutions are described by referring mainly to examples and embodiments thereof. In the following description, numerous specific details are set forth in order to provide a thorough understanding of the proposed approach and solutions. It will be readily apparent, however, that the proposed approach and solutions may be practiced without limitation to these specific details. In other instances, some methods and structures readily understood by one of ordinary skill in the art have not been described in detail so as not to unnecessarily obscure the ongoing description. As used herein, the terms "a" and "an" are intended to denote at least one of a particular element, the term "includes" means includes but not limited to, the term "including" means including but not limited to, and the term "based on" means based at least in part on, the term "based upon" means based at least in part upon, and the term "such as" means such as but not limited to. The term "relevant" means closely connected or appropriate to what is being performed or considered.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules.

A computer system (standalone, client or server computer system) configured by an application may constitute a "module" (or "subsystem") that is configured and operated to perform certain operations. In one example, the "module" or "subsystem" may be implemented mechanically or electronically, so a module includes dedicated circuitry or logic that is permanently configured (within a special-purpose processor) to perform certain operations. In another example, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Unless otherwise defined, all technical and scientific terms used herein have the same meaning as commonly understood by those skilled in the art to which this disclosure belongs. The system, methods, and examples provided herein are only illustrative and not intended to be limiting.

In some implementations, a communication system uses machine learning or artificial intelligence (AI) model/algorithms to perform bandwidth allocation/flow control decisions. In some implementations, a communication system uses machine learning or artificial intelligence (AI) model/algorithms to perform jitter handling/controlling decisions. The system can use an AI/ML approach to train a model using the results calculated using bandwidth allocation/control and/or jitter handling algorithms. By training with many examples of results of the algorithms for different conditions, the model learns to predict the results of the algorithm, such as the number of slots allocated/jitter handling to a device given various network conditions. The trained machine learning model can then be deployed and used to perform allocation and/or jitter handling decisions, instead of or alongside the algorithms. The machine learning model can thus be trained to provide allocation decisions that replicate or approximate those of the algorithms. The machine learning model can often generate these allocation decisions more quickly and with less computation than the algorithms themselves.

The techniques of training and using an AI/ML model to predict allocation amounts for devices can be used for forward channel allocation (e.g., from the network to the terminal) and/or return channel allocation (e.g., from the terminal to the network). Separate models can be trained and used for forward channel allocation prediction and reverse channel allocation prediction. Thus, the techniques herein can be used for the forward channel or out-route (e.g., the path from a gateway to a satellite, and then to a terminal) as well as the return channel or in-route (e.g., the path from a terminal to a satellite, then to a gateway).

As discussed further below, allocation data and jitter handling data may be collected for the purpose of analyzing the underlying relationship between terminal backlog, in-route capacity, actual allocation results, jitter occurrences, jitter handling, and the like. Supervised machine learning can then be used to train a machine learning model, such as a neural network (NN), to be able to predict allocation results. The trained AI/ML model and the predicted results it provides can then replace the original bandwidth allocation/flow control and/or jitter handling algorithm to provide relatively accurate results while boosting the performance of a system. In some implementations, the model is used to predict allocations to handle data transfer backlogs for terminals.

The techniques in the application can be used in an in-route group manager (IGM), which can be associated with or integrated into a network gateway, such as a gateway of a satellite communication network. The technique is not limited to predicting in-route allocation and may be also used for out-route allocation. The techniques can be used for allocation by a physical network environment, a virtual network environment, a virtual network operator (VNO), a network service provider (NSP), an in-route bandwidth manager (IBM), an out-route bandwidth manager (OBM), a bandwidth distributing (BD) unit, and/or a general bandwidth manager (BWM).

For example, the VNO may be an entity that provides network services to customers without owning the underlying physical network infrastructure. VNOs acquire bandwidth and network resources from established mobile network operators (MNOs) and subsequently resell these services under their own brand to end customers. This business model allows VNOs to offer competitive mobile services without incurring the substantial upfront costs associated with building and maintaining their own network infrastructure. Further, the NSP may be an entity that owns and operates the physical infrastructure of a network. This infrastructure includes the cables, routers, switches, and other components that form the backbone of the network. NSPs provide network services to various entities, including the VNOs. The NSPs operate in the physical or underlying network infrastructure. In an example, the NSPs may not provide services directly to consumers, however, instead focus on providing wholesale services to other businesses.

In addition, the IBM may be a network device responsible for managing the flow of incoming traffic. The IBMs typically utilize deep packet inspection (DPI) technologies to identify and prioritize diverse traffic types, ensuring smooth operation of critical traffic and preventing non-critical traffic from consuming excessive bandwidth. Further, the IBMs may be crucial in ensuring quality of service (QoS) for latency- and jitter-sensitive applications and services. Further, the OBM may be a network device tasked with managing the flow of outgoing traffic. The OBMs may employ traffic shaping techniques to ensure that outbound traffic may be transmitted at the appropriate rate and does not overwhelm the network's capacity. Additionally, the OBMs may be used to prioritize various types of outgoing traffic, guaranteeing that critical traffic is sent first. Additionally, the BD is a network device responsible for distributing available bandwidth amongst different users or applications. The BDs may leverage various algorithms to ensure fair and efficient bandwidth distribution/flow control, preventing any single user or application from monopolizing the available resources. Further, the BWM may be a network device that provides centralized control and management of bandwidth across a network. The BWMs may be used to configure, monitor, and set bandwidth limitations for different users or applications, while also prioritizing various types of traffic. The BWMs may play a critical role in maintaining appropriate bandwidth utilization and performance across the network.

The specific functionalities and capabilities of each of these components may vary depending on the implementation specifics and the network's requirements. The components often operate in conjunction with other network devices, such as routers, switches, and firewalls, to provide a comprehensive network management solution. While the terms "bandwidth manager" and "bandwidth distributer" are sometimes used interchangeably, they can also refer to distinct components with specialized functions.

In some implementations, the system may use the AI/ML model, a network gateway (or the IGM, IBM, BD, or other element of a network) to receive a request from a device seeking bandwidth on the network. The gateway forms input to the model based on the request and other network factors and uses output from the machine learning model to allocate backlog bandwidth for the device. For example, the input to the machine learning model can include data about, for example, a device that set the request, a terminal to gateway connection, and a status of the system or gateway. As noted above, the AI/ML model may be previously trained using data output by algorithms designed to determine bandwidth allocation, and so can generate allocation results that are typically the same as or very close to results from the algorithms. The output from the model can include a predicted or recommended bandwidth allocation to provide to the device in response to the request. In some implementations, the gateway may select either the AI/ML model or the bandwidth allocation algorithms to allocate bandwidth based on factors such as network traffic levels, a number of connected devices, latency requirements, and the like.

As an example, a router may have access to a virtual network and a physical network, with both being available concurrently and both providing different performance characteristics. The router may use a classifier to assign packets to be transmitted to different classes, for example, different classes of service, and then use the class assignments and expected latencies for transmission to select which network transport modem to use to transmit the packets. For example, the router may select, to send packets that are not sensitive to latency (e.g., bulk transfers) over the network transport modem having a lowest data usage cap, lowest cost, highest throughput, and/or other advantages. For packets that are very latency-sensitive, the router may select to send packets over a lowest-latency connection.

The technique in the present disclosure resides within the realm of networking and addresses several key areas with significant applications for both virtual network environment and physical network environment. The virtual network environment may include the virtual network operators (VNOs) and the physical network environment may include the network service providers (NSPs). Virtualization of network infrastructure may empower the VNOs to create virtual private networks (VPNs) by leveraging existing internet and VPN connections, eliminating the need for investment in large physical infrastructure. This enables the VNOs to offer competitive services to the customers while maintaining operational efficiency. Even when the underlying broadband connection lacks native QoS support, the VNO technology enables the VNOs to deliver quality of service (QoS) guarantees to their customers. This ensures that critical applications receive the necessary bandwidth and latency to function optimally, resulting in a superior user experience. The disclosed technology provides solutions to mitigate the high latency associated with satellite communications, particularly GEO satellites. This allows the VNOs to provide reliable internet access to customers in remote locations, expanding their reach and market potential. Further, the technique of the disclosure integrates with various cellular network technologies (fourth generation (4G), long term evolution (LTE), fifth generation (5G), and the like), enabling the VNOs to provide respective customers with uninterrupted wireless internet access. This enhances the VNO's service portfolio and fosters customer satisfaction.

The technology in the present disclosure empowers the NSPs to optimize an existing internet and the VPN networks by leveraging multiple transport mechanisms (e.g., terrestrial, satellite). This results in improved service reliability, increased efficiency, and reduced operational costs for the NSPs. Further, the present disclosure implements and enforces the QoS and bandwidth management policies across the NSP and the VNO networks. This ensures that critical applications and services receive priority bandwidth, resulting in improved network performance and optimized resource allocation. Further, the present disclosure empowers the NSPs to expand the network reach and service portfolio by leveraging existing infrastructure and integrating diverse technologies, such as satellite and cellular networks. This allows NSPs to cater to a wider range of customers and evolve in landscape of network services.

The present disclosure provides systems and methods for dynamic bandwidth allocation and jitter handling in multi-tiered satellite networks. The system includes a first network path comprising a physical network environment. The physical network environment includes a first network gateway associated with the first network path. Further, the system includes a second network path comprising a virtual network environment. The virtual network environment includes a second network gateway associated with the second network path. Additionally, the system includes a bandwidth distributing (BD) unit communicatively coupled to at least one of the first network gateway and the second network gateway. The BD unit includes a multi-tier network entity management mode.

Further, the BD unit retrieves, periodically, a bandwidth report from an in-route group manager (IGM) (e.g., the IBM retrieves the bandwidth report from the IGM and then the bandwidth report is sent to the BD unit by the IBM) associated with each of at least one of the first network gateway and the second network gateway. The bandwidth report includes a request, from a plurality of devices, for bandwidth on at least one of the physical network environments and the virtual network environment. Furthermore, the BD unit analyzes data indicating a status of the virtual network environment and the physical network environment. The status corresponds to an aggregated bandwidth demand for the virtual network environment and the physical network environment. Additionally, the BD unit compares a bandwidth demand value associated with the aggregated bandwidth demand, with a first pre-defined threshold value associated with the physical network environment and a second pre-defined threshold value associated with the virtual network environment. Further, the BD unit switches from, a multi-beam management mode corresponding to an in-route bandwidth manager (IBM) associated with the IGM, to the multi-tier network entity management mode, based on a comparison result.

Further, the BD unit determines a bandwidth adjustment parameter corresponding to at least one of the virtual network environment, and a beam associated with the virtual network environment, based on the switching the mode. The bandwidth adjustment parameter is determined for the virtual network environment within at least one of the physical network environment and the virtual network environment. Furthermore, the BD unit allocates a bandwidth for each of the plurality of devices associated with the virtual network environment and transmits allocated bandwidth information to an in-route bandwidth manager (IBM) associated with the IGM. Additionally, the BD unit triggers the IBM to apply the allocated bandwidth for each of the plurality of devices associated with the virtual network environment. Further, the BD unit receives, from the IBM, a scaling factor corresponding to the allocated bandwidth, upon triggering the IBM. The received scaling factor is transmitted to the IGM. Additionally, the BD unit switches back to the multi-beam management mode via the IBM from, the multi-tier network entity management mode, based on the comparison result, upon transmitting the scaling factor to the IGM.

Referring now to the drawings, and more particularly to FIG. 1 through FIG. 8, where similar reference characters denote corresponding features consistently throughout the figures, there are shown preferred examples, and these examples are described in the context of the following exemplary system and/or method.

FIG. 1 illustrates a block diagram representation of a network architecture 100 for a system 102 for a dynamic bandwidth allocation and jitter handling in multi-tiered satellite networks, according to an example. The network architecture 100 depicts a satellite communication system, however the techniques may also be used in other communication systems. The system 102 may include a gateway 104 that communicates with a satellite 106, and the satellite 106 may communicate with various satellite terminals such as the terminals 108. The satellite 106 and the gateway 104 (along with potentially other network components) cooperate to transfer data to and from the terminals 108 to a network associated with a router 110, which can include Internet 112. Each of the terminals 108 may be in communication with each of a plurality of devices 114, such as mobile phones, laptop computers, desktop computers, internet of things (IoT) devices, wearables, and so on, which make use of the network connections provided by the gateway 104, the satellite 106, terminals 108, and the router 110.

In the example of FIG. 1, the gateway 104 may include functionality to allocate limited data transfer bandwidth among the terminals 108 that are concurrently connected. This functionality may be implemented as an in-route group manager (IGM) 116, an in-route bandwidth manager (IBM) 118, a bandwidth distributing (BD) unit 120, or in another form associated with the system 102 or the gateway 104. The network architecture 100 may use a time division multiple access (TDMA) channel access method, and the allocation of bandwidth to the terminals 108 may be performed through the assignment of slots in a TDMA communication frame. The IGM 116 (or other component) of the gateway 104 may be responsible for allocating slots in the TDMA communication frame for terminals 108 that are connected. Typically, the amount of bandwidth allocated, and the corresponding slot assignments are updated frequently, often for each frame. The assignments may be required to be performed quickly, for example, within a period of 4-5 milliseconds or less (e.g., current in-route frame=20 ms), so the new slot assignments can be sent and reach terminals in time to be used in the next frame.

Further, the efficiency and capacity of the BD unit 120 (or the IGM 116 and/or the IBM 118) to generate bandwidth allocations can be significantly improved by using a trained machine learning (ML) or artificial intelligence (AI) algorithms/model associated with the BD unit 120 to perform allocation decisions rather than using existing computed algorithms. The ML/AI model can be trained using examples of the results from algorithms, so the model learns to provide results that sufficiently replicate or approximate the results from the algorithms. However, the AI/ML model can learn to provide these results based on inputs that do not require dependency on other allocation decisions for the upcoming frame.

In other words, the AI/ML model can be trained to provide the highly accurate results generated sequentially using dependencies among allocations, even from inputs that do not indicate reflect any dependency. In this manner, the AI/ML model learns the general pattern of allocation decisions, implicitly learning the conditions that tend to result in dependencies that alter allocation decisions even though dependencies are not indicated to the model. Because the AI/ML model decisions are made using less information than the more complex sequentially computed algorithms, the machine learning approach can provide a tradeoff of somewhat less optimal allocation in exchange for significantly faster processing. As a result, the AI/ML model can be used to generate allocation decisions that are more accurate than traditional algorithms that would not take into account the full set of active terminals, and faster and more efficient than algorithms that would take into account the full set of active terminals.

The example of FIG. 1 depicts the gateway 104 using the BD unit 120 to execute the AI/ML models to determine amounts of bandwidth to allocate to the terminals 108. The BD unit 120 may also include bandwidth allocation algorithms that can be used to make allocation decisions. The results of using the bandwidth allocation algorithms, as well as the inputs to the algorithms that resulted in the results, can be stored in a data storage (not shown), and used to train the AI/ML model. The example of using the AI/ML models may be discussed using various stages, which represent a flow of data and can be performed in the order indicated or in another order. Below, various aspects of satellite networks, bandwidth allocation algorithms, bandwidth flow control algorithms, may be discussed.

In the network architecture 100, each terminal 108 may include a satellite beam assignment and a gateway assignment. In general, when the terminal 108 is installed, a beam assignment (e.g., a spot beam of the satellite 106) may be determined based on a location of the terminal 108. Each terminal 108 may be assigned to only one beam or resource pool at a time. Each beam may be associated with one or more gateways. The spectrum of one satellite beam may be segmented into a plurality of in-routes. For example, the frequency spectrum of a satellite beam can be split into a number of in-routes with symbol rates of, for example, 512 kilo symbols per second (ksps), 1 mega symbol per second (Msps), 2 Msps, 4 Msps, and the like. In-routes within a certain geographical area that share these spectrum resources can be handled hierarchically. A grouping of in-routes that are at the same symbol rate and handled as a common pool can be referred to as an in-route group (IG). IGs of multiple symbol rates can also be handled as a common pool or set. The entire shared spectrum of a given satellite spot beam may be split into several such common sets. The BD unit 120 (or the IGM 116 and/or the IBM 118) can refer to a network entity that manages bandwidth for such a common set of multiple IGs. Depending on the digital modulation scheme that is utilized (e.g., quadrature phase shift keying (QPSK)), the number of symbols used to communication can vary, and as such, the symbol rate can also vary. The number of bits per symbol used to communicate can vary, and as such, the total capacity can also vary.

It should be noted that, the BD unit 120 (or the IGM 116 and/or the IBM 118) can be independent of a particular beam of the satellite, however an in-route is dependent on an IGM/IBM. Therefore, an IGM/IBM can manage in-routes of different beams, but any one particular in-route may be managed by only a single IGM/IBM. These features of a satellite network can be leveraged to allocate bandwidth for and govern network usage of terminal groups (TGs) (TGs may be same as the VNO) over a multi-beam satellite network.

Accordingly, various implementations of the systems and methods disclosed herein provide techniques for bandwidth management among TGs in a shared access network. Such techniques may be applicable to network resources providing service in the same direction, e.g., from an access point to an aggregation point or from an aggregation point to an access point.

In some implementations, the BD unit 120 (or the IGM 116 and/or the IBM 118) determines current or actual bandwidth usage for terminals in multiple TGs that share in-routes managed by the IGM. The IGM shares this information with a bandwidth manager such as the BD unit 120, which evaluates the current or actual throughputs of the TGs against their respective subscribed rates. Depending on the throughput of a TG relative to its minimum and maximum subscribed rates, the bandwidth manager issues a scaling factor for that TG, which either increases, decreases, or maintains the throughput of that TG. The BD unit 120 (or the IGM 116 and/or the IBM 118) receives the scaling factors from the bandwidth manager and applies these factors to their respective terminals in its TGs. Thus, each BD unit 120 (or the IGM 116 and/or the IBM 118) may perform throughput management via bandwidth allocation for terminals in multiple TGs that share in-routes managed by the IGM/IBM. And accordingly, the BD unit 120 may perform throughput management of individual TGs throughout an entire network, which may contain multiple IGMs/IBMs. Throughput can refer to the rate at which digital bits of information are transferred over some communication channel and can be measured in, e.g., bits/second or in the case of data packets, in data packets/second or data packets/time slot. Throughput can be considered, essentially, to be synonymous with digital bandwidth consumption.

At a BD unit level, bandwidth management can be considered to be "centralized" in that throughput can be managed network-wide for each TG (based on congestion status of the network and subscription rate profile/plan). At an IGM/IBM level, bandwidth management can be considered as being "distributed" in that an IGM/IBM can perform throughput management (independently of other IGMs/IBMs), where the maximum throughput level to which a terminal (in a TG) is entitled can be realized. Accounting for the considerations can be accomplished through the use of a scaling factor that can be introduced by the bandwidth manager at the IGM/IBM level (for each TG) that is based on the available bandwidth of an IGM/IBM and the throughput of each TG. Hence, a hybrid, centralized-distributed feedback control mechanism may be achieved for managing bandwidth in accordance with various implementations. It should be noted that although various implementations for providing bandwidth management are described in the context of the in-route, various implementations can provide bandwidth management on the out-route in addition or as an alternative. Various implementations are also applicable to any wireless or wireline networks where throughput limits based on subscribed rates need to be imposed upon a group of users that may be spread over different IGM/IGM subsystems or geo-locations inside the network.

It should be noted that although various implementations described herein are directed to the aforementioned hybrid, centralized control mechanism, other implementations can be a completely centralized solution. Alternatively, still, a completely decentralized implementation is also possible from an IGM/IBM-level perspective.

As alluded to above, an IGM/IBM may perform throughput management via bandwidth allocation for terminals in multiple TGs that share in-routes managed by the IGM. A TG in a network can be bounded by/associated with a subscription rate plan/profile. The IGM/IBM is also aware of, e.g., what terminals in a TG exist, where those terminals may be operating and with what IG they are associated, in addition to how much bandwidth each terminal in the TG is using. Accordingly, on the in-route, the IGM/IBM can manage IGs while tracking the throughput of each terminal in a particular TG and across multiple TGs, if required. The IGM 116 may report this tracked throughput information/bandwidth usage to a (centralized) bandwidth manager such as the IBM 118 and/or BD unit 120. As also alluded to above, a bandwidth manager can perform throughput management of individual TGs throughout an entire network, which may contain multiple IGMs/IBMs. That is, the bandwidth manager can monitor bandwidth usage for each TG across multiple IGMs and determine whether or not the bandwidth usage remains within the parameters/limits of the subscription rate plan associated with each TG. If the throughput remains within the subscription rate plan parameters, the BD unit 120 may allow the terminals, TGs, and IGs to operate in the manner with which they are currently operating. In accordance with some implementations, the BD unit 120 (e.g., the BD unit 120 may function, when the requested bandwidth exceeds the NSP/VNO configured limit) can also scale-up the applicable throughput where there is adequate available bandwidth. In contrast, if the throughput of a TG exceeds or at the least begins to approach the subscription rate plan limits for bandwidth usage, the BD unit 120 can instruct the IGM/IBM managing the IG with which the TG is associated, to throttle down on bandwidth consumption until the subscription rate plan limits can be met or are no longer exceeded. Hence, the IGM/IBM can react to BD unit control (when needed) via a scaling factor in order to remain within the bandwidth usage parameters of a TG's subscription rate plan. It should be noted that because, as described above, symbols can be divided, use of a scaling factor at an IGM/IBM to indirectly adjust bandwidth allocation can be preferable to some manner of centralized control in certain scenarios.

Each IGM/IBM may manage multiple channels, e.g., two in-routes having symbol rates of 4 Msps. On the in-route, the BD unit 120 may be aware of the subscription rate for each TG. By way of the IGM reporting, the BD unit 120 may also be aware of how much bandwidth each terminal/TG is consuming within each applicable IGM/IBM and across multiple IGMs/IBMs.

Referring to the gateway 104, one or more bandwidth allocation and/or bandwidth flow control algorithms can be used to determine allocations and/or control the flow of allocations. For example, major functions of the allocation and/or flow control algorithms are to allocate/control flow bandwidth at the priority level and allocate/control flow bandwidth at the terminal level. To allocate bandwidth at the priority level, the algorithms can use two loops. The IGM uses a first loop that uses preconfigured priority weights to pre-allocate bandwidth for each of multiple queues representing different priority levels. The IGM uses a second loop to adjust the bandwidth for each queue based on an aggregated measure of backlog among active terminals.

The inputs for the algorithms may include backlog reports from the terminals 108, total available bandwidth of the in-route, the predefined priority weights, and the scaling factors. The output is the overall bandwidth allocation/flow control for each terminal, e.g., a number of slots in a TDMA frame. As each terminal has its allocation determined, the IGM/IBM decreases the amount of bandwidth available in the upcoming frame, sequentially assigning allocations to the various terminals. Optionally, there are a few intermediate results from the algorithms that may be useful such as the budget bandwidth amount, the carryover bandwidth amount, and throughput. These additional elements may be used for the initial model training as auxiliary input data.

More specifically, a set of main inputs to the algorithms can be collected and subsequently used as inputs to the machine learning model. In general, at least some terminal-related configuration information comes from the link layer. Examples of collected data types used for input to the model include, for a given terminal, but not limited to, a last allocation history, indicating previous allocations to the terminal over the last few frames, a last non-constant bit rate (CBR) allocation history, indicating an amount of allocations over the last few frames that are not CBR or real-time transfers (e.g., not voice-over-IP (VOIP) or similar traffic), an last backlog update time for the terminal, indicating the last time the terminal updated its backlog (e.g., a frame number for the last frame in which the backlog report was received), and the like.

Further, the collected data types used for input to the model include, but not limited to, a number of CBR slots reserved for the terminal, advertised backlog slot amounts for the terminal for each priority level, e.g., values showing the amount the terminal indicates to the IGM/IBM for each priority level, current backlog slot amounts for the terminal for each priority level, values showing the amounts of current outstanding backlog on the IGM/IBM side for the terminal at the end of the prior frame (this can be involve by subtracting how many backlog slots are recently allocated), and the like. Furthermore, the collected data types used for input to the model include, but not limited to, a scaling factor for the service provider for the terminal, e.g., a factor received from a virtual network operator (VNO) controller, based on a layer of flow control (e.g., a measure that can be used to monitor overall usage of a service provider as a whole, which can be used to determine if one service provider is over a corresponding quota), a throughput measure showing actual user data sent in the last frame for the terminal, and the like, and combinations thereof.

In an example, one approach is for the gateway 104 is to evaluate current conditions to select different algorithms to determine allocations/flow control. This can be performed by setting a threshold. The decision of which technique to employ may be revisited periodically, for example, after a certain amount of time or a certain number of frames. An example of how the system 102 may be used may now be described with reference to FIG. 1.

In some examples, the network architecture 100 for the system 102 may also include a private network and/or public network (not shown in FIGS.). The private network and/or public network may include any variations of networks. For example, the private network may be a local area network (LAN), and the public network may be a wide area network (WAN). Also, the private network and/or public network may each be a local area network (LAN), wide area network (WAN), the Internet, a cellular network, a cable network, a satellite network, or other network that facilitates communication between the components of system 102 as well as any external element or system connected to the private network and/or public network. The private network and/or public network may further include one, or any number, of the example types of networks mentioned above operating as a stand-alone network or in cooperation with each other. For example, the private network and/or public network may utilize one or more protocols of one or more clients or servers to which they are communicatively coupled. The private network and/or public network may facilitate the transmission of data according to a transmission protocol of any of the devices and/or systems in the private network and/or public network. Although each of the private network and/or public network may be a single network, it should be appreciated that in some examples, each of the private network and/or public network may include a plurality of interconnected networks as well.

Further, the network architecture for the system 102 may include the terminals 108, which may be used by, but is not limited to, a user, a customer, an administrator, a network operator, an operator, and/or type of users. Depending on the application, the terminals 108 may include or incorporate any number of antenna dishes, which may be provided in various sizes, depths, or dimensions (e.g., small, medium, or large). Although the terminals may typically remain in the same location once mounted, the terminals may be removed from their mounts, relocated to another location, and/or may be configured to be mobile terminals. For example, the terminals may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other type of vehicles/commuting means. It should be appreciated that such terminals may be transportable (mobile) terminals that remain operational during transit. As used herein, the terms "terminal," "customer terminal," "satellite terminal," and/or "hub stations" may be used interchangeably to refer to these terminal types.

It should be appreciated that any number of the plurality of devices 114 may be communicatively coupled to the terminals. In some examples, the plurality of devices 114 may include any number of computing or mobile devices. For example, such a computing or mobile device may include, but is not limited to, a laptop, a tablet, a mobile phone, a wearable computing device, a payment terminal, an appliance, a camera, a sensor, a thermostat, a display, and/or other interfaces. In general, the plurality of devices 114 may be connected to, but not limited to, any number of network-enabled computing devices, elements, or systems. It should be appreciated that a network of such devices may be commonly referred to as internet of things (IoT) devices. The terminals 108 may be provided as a standalone, transport integrated, hybrid integrated, or fully integrated single device solution. In the standalone configuration, all WAN modems and accelerators may be provided as standalone devices.

Further, the network architecture for the system 102 may include a satellite 106 as shown in FIG. 1 which may be an object intentionally placed into orbit. In some examples, the satellite may be an artificial satellite that may be configured to transmit and receive data signals. For example, the satellite 106 may from one or more beams (e.g., spot beams) and provide connectivity between at least the terminals 108 and the gateway 104. More specifically, the satellite 106 may communicate data signals using these beams with the terminals via a terminal return channel and a terminal forward channel, and with the gateway via a gateway return channel and a gateway forward channel (not shown). It should be appreciated that the satellite may from any number of beams to communicate data signals with any number of components, even beyond the terminals or the gateway 104.

In some examples, the satellite 106 may be a communication satellite, such as a GEO satellite, MEO satellite, LEO satellite, and the like. In some examples, the satellite 106 may include, but is not limited to, a transponder satellite, a regenerative satellite, and/or other similar satellite that may generate one or more spot beams. Furthermore, in some examples, the satellite may operate in geosynchronous, mid-earth, low-earth, elliptical, or some other orbital configuration. For example, a geostationary earth orbit (GEO) spot beam, a low-earth orbit (LEO) spot beam, a medium earth orbit (MEO) spot beam, and/or other type of spot beam.

Figure 2:
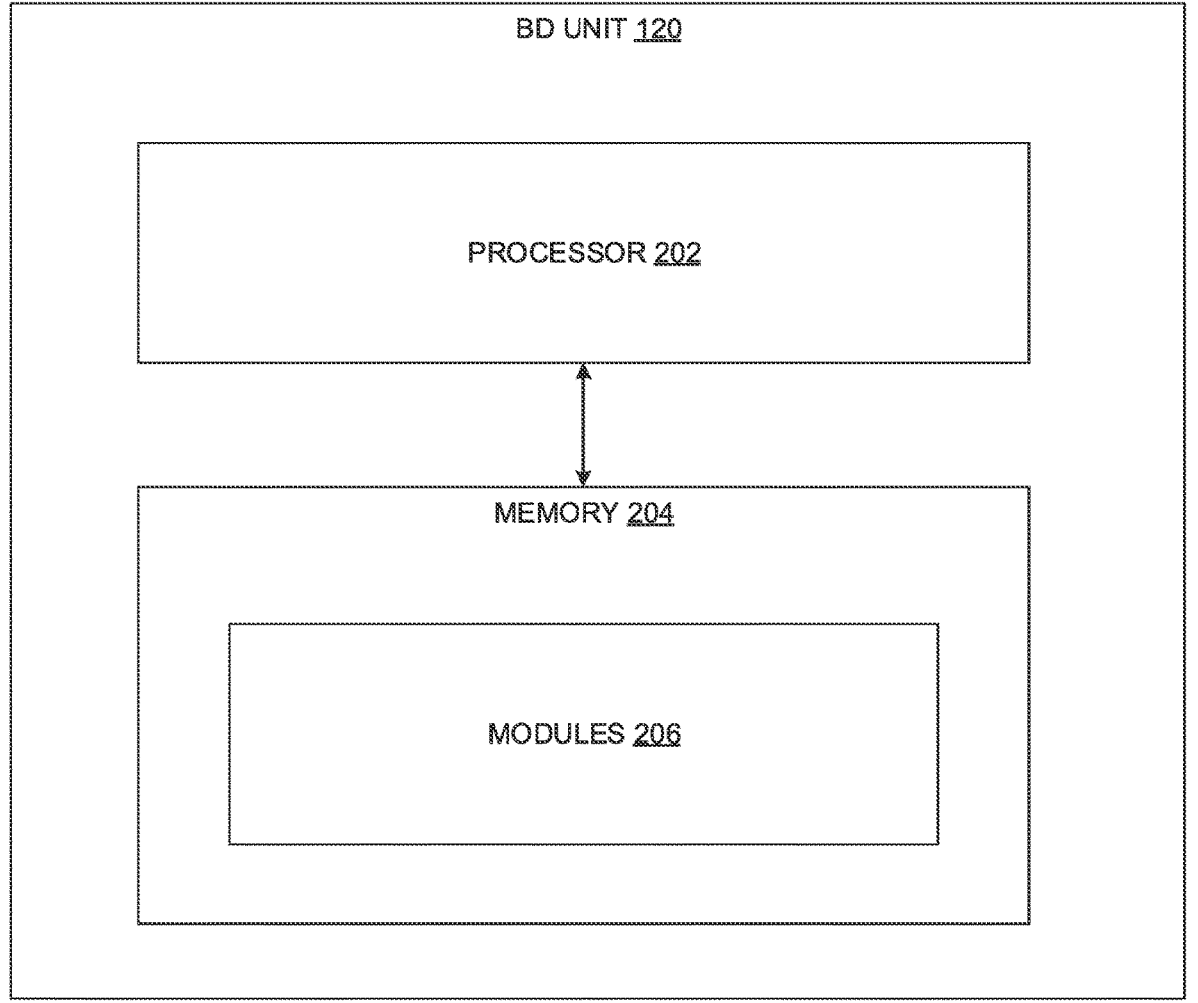
FIG. 2 illustrates a block diagram representation of a bandwidth distributing (BD) unit, such as those shown in FIG. 1, capable of dynamic bandwidth allocation and jitter handling in multi-tiered satellite networks, according to an example.
Figure 3:
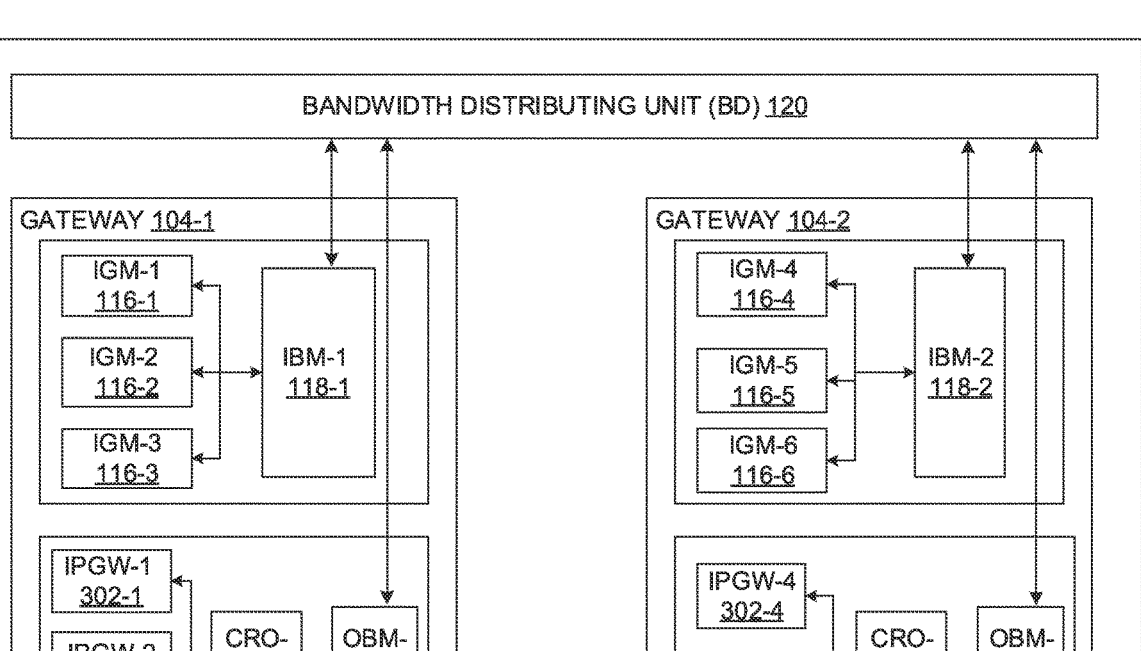
FIG. 3 illustrates a block diagram representation of a system comprising a plurality of gateways associated with a bandwidth distributing (BD) unit, according to an example.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the network architecture 100 for the system 102, and components, as shown in FIGS. 1-3.

In an example, the system 102 may communicate with the satellite 106 via a first network path comprising a physical network environment. The physical network environment includes a first network gateway such as the gateway 104 associated with the first network path. Further, the system 102 may communicate with the satellite 106 via a second network path comprising a virtual network environment. The virtual network environment includes a second network gateway such as the gateway 104 associated with the second network path. In an example, the physical network environment includes network service providers (NSPs), and the virtual network environment includes virtual network operators (VNOs), and the like.

In an example, the BD unit 120 may be communicatively coupled to at least one of the first network gateway and the second network gateway such as the gateway 104. For example, the BD unit 120 may operate in a multi-tier network entity management mode. In an example, the system 102 may execute the BD unit 120 to retrieve, periodically, a bandwidth report from IGM 116 associated with each of at least one of the first network gateway and the second network gateway. The bandwidth report may include, but not limited to, a request, from the plurality of devices 114, for bandwidth on at least one of the physical network environment and the virtual network environment. Further, the system 102 may execute the BD unit 120 to analyze data indicating a status of the virtual network environment and the physical network environment. In an example, the status of the virtual network environment and the physical network environment may correspond to, but not limited, an aggregated bandwidth demand for the virtual network environment and the physical network environment, a throughput for the virtual network environment and the physical network environment, an available bandwidth for each of the virtual network environment and the physical network environment, and the like.

In an example, the system 102 may execute the BD unit 120 to compare a bandwidth demand value associated with the aggregated bandwidth demand, with a first pre-defined threshold value associated with the physical network environment and a second pre-defined threshold value associated with the virtual network environment. In an example, the system 102 may execute the BD unit 120 to switch from, a multi-beam management mode corresponding to the in-route bandwidth manager (IBM) 118 associated with the IGM 116, to the multi-tier network entity management mode, based on a comparison result. Switching from the multi-beam management mode to the multi-tier network entity management mode, may be based on determining a traffic value associated with a traffic in the allocated bandwidth for the plurality of devices 114, is greater than a traffic threshold value. Further, the system 102 may execute the BD unit 120 to determine a bandwidth adjustment parameter corresponding to at least one of the virtual network environment, and a beam associated with the virtual network environment, based on switching the mode. The bandwidth adjustment parameter may be determined for the virtual network environment within at least one of the physical network environment and the virtual network environment.

In an example, the system 102 may execute the BD unit 120 to allocate a bandwidth for each of the plurality of devices 114 associated with the virtual network environment. The allocation of bandwidth to the plurality of devices 114 is based on determining, but not limited to, bandwidth demand value, assigned weighted value to each of the plurality of devices 114, service level agreements (SLAs), resource availability, traffic characteristics, network conditions, historical usage patterns of the plurality of devices 114, priority levels for the plurality of devices 114, and the like. Further, the system 102 may execute the BD unit 120 to transmit allocated bandwidth information to the IBM 118 associated with the IGM 116. In an example, the system 102 may execute the BD unit 120 to trigger the IBM 118 to apply the allocated bandwidth for each of the plurality of devices 114 associated with the virtual network environment.

In an example, the system 102 may execute the BD unit 120 to receive, from the IBM 118, a scaling factor corresponding to the allocated bandwidth, upon triggering the IBM 118. The received scaling factor may be transmitted to the IGM 116. Further, the system 102 may execute the BD unit 120 to switch back to the multi-beam management mode via the IBM 118 from, the multi-tier network entity management mode, based on the comparison result, upon transmitting the scaling factor to the IGM. (e.g., the BD unit 120 switches the mode based on whether requested bandwidth is greater than the bandwidth threshold limit)

In an example, the system 102 may execute the BD unit 120 to compare an amount of time corresponding to the allocation of bandwidth for each of the plurality of devices 114, with a pre-defined time. In an example, the system 102 may execute the BD unit 120 to compare the bandwidth demand value associated with the aggregated bandwidth demand with the first pre-defined threshold value and the second pre-defined threshold value. Further, the system 102 may execute the BD unit 120 to allocate progressively, bandwidth for each of the plurality of devices 114 associated with the virtual network environment, until a maximum throughput threshold value associated with the virtual network environment is attained, based on a comparison result. In an example, the system 102 may execute the BD unit 120 to trigger the IBM 118 to apply the allocated bandwidth for each of the plurality of devices 114 associated with the virtual network environment, based on progressively allocating bandwidth for each of the plurality of devices 114, until the maximum throughput threshold value is attained. Further, the system 102 may execute the BD unit 120 to receive, from the IBM 118, (i.e., scaling factor may be calculated by the IBM 118 and then the scaling factor is sent to the IGM 116.) a scaling factor corresponding to the progressively allocated bandwidth for each of the plurality of devices 114, upon triggering the IBM 118. The received scaling factor may be transmitted to the IGM 116. Further, the system 102 may execute the BD unit 120 to switch back, to the multi-beam management mode via the IBM 118 from, the multi-tier network entity management mode, based on the comparison result, upon transmitting the scaling factor to the IGM 116.

The examples of systems and methods herein enables the VNOs to provide secure and reliable virtual private network (VPN) solutions, catering to organizations and individuals seeking privacy and security in online activities. The VNOs and the NSPs can ensure optimal performance for critical applications such as video conferencing, online gaming, and real-time communication, guaranteeing a seamless user experience. Further, the VNOs and NSPs can provide reliable internet access via satellite, expanding their reach to remote areas and catering to customers who lack terrestrial network coverage. Additionally, the VNOs and the NSPs can leverage technologies such as non-terrestrial 5G and 6G to offer high-speed and low-latency wireless connectivity to their customers, improving user experience and enabling the growth of data-intensive applications. Furthermore, the VNOs and the NSPs can combine multiple broadband transport modes, such as cable and fiber, to create a hybrid network that provides superior reliability and availability than what is possible with any single transport mode, leading to improved network uptime and reduced service disruptions.

In some implementations, the VNOs and the NSPs can utilize software-defined radio (SDR) systems (e.g., software-defined wireless access networks (SD-WAN)), which consist of software-programmable components instead of traditional hardware, to achieve greater flexibility and reconfigurability in their networks. This allows them to quickly adapt to changing technologies and market demands, ensuring they remain competitive and at the forefront of technological advancements. By optimizing resource utilization and network infrastructure through advanced technologies, the VNOs and the NSPs can achieve significant cost reductions, improving their profitability and allowing them to offer more competitive pricing to their customers. In some implementations, the SDR systems and reconfigurable network architectures allows the VNOs and the NSPs to readily adapt to the evolving technological landscape and changing network demands.

FIG. 2 illustrates a block diagram representation of the bandwidth distributing (BD) unit 120, such as those shown in FIG. 1, capable of dynamic bandwidth allocation and jitter handling in multi-tiered satellite networks, according to an example. The BD unit 120 may be communicatively coupled to at least one of the first network gateway and the second network gateway such as the gateway 104. Further, the BD unit 120 may operate in a multi-tier network entity management mode. The BD unit 120 may include a processor 202 and a memory 204 coupled to the processor 202. The memory 204 may include processor-executable instructions, which on execution, cause the processor 202 to perform one or more operations described herein. Further, the memory 204 may include a plurality of modules 206. The modules 206 may include, but are not limited to, a retrieving module, an analyzing module, a comparing module, a switching module, a determining module, an allocating module, a triggering module, a receiving module, and/or other modules. Each of these modules when executed by the processor 202 perform one or more functionalities described in the context of the system 102, and may also be performed by the gateway 104, the router 110, and/or the IGM 116, and/or the IBM 118.

In an example, the retrieving module may retrieve, periodically, a bandwidth report from IGM 116 associated with each of at least one of the first network gateway and the second network gateway. The bandwidth report may include, but not limited to, a request, from the plurality of devices 114, for bandwidth on at least one of the physical network environment and the virtual network environment. Further, the system 102 may execute the BD unit 120 to analyze data indicating a status of the virtual network environment and the physical network environment. In an example, the status of the virtual network environment and the physical network environment may correspond to, but not limited, an aggregated bandwidth demand for the virtual network environment and the physical network environment, a throughput for the virtual network environment and the physical network environment, an available bandwidth for each of the virtual network environment and the physical network environment, and the like.

In an example, the comparing module may compare a bandwidth demand value associated with the aggregated bandwidth demand, with a first pre-defined threshold value associated with the physical network environment and a second pre-defined threshold value associated with the virtual network environment. In an example, the switching module may switch from, a multi-beam management mode corresponding to the IBM 118 associated with the IGM 116, to the multi-tier network entity management mode, based on a comparison result. Switching from the multi-beam management mode to the multi-tier network entity management mode, may be based on determining a traffic value associated with a traffic in the allocated bandwidth for the plurality of devices 114, is greater than a traffic threshold value. Further, the determining module may determine a bandwidth adjustment parameter corresponding to at least one of the virtual network environment, and a beam associated with the virtual network environment, based on switching the mode. The bandwidth adjustment parameter may be determined for the virtual network environment within at least one of the physical network environment and the virtual network environment.

In an example, the allocating module may allocate a bandwidth for each of the plurality of devices 114 associated with the virtual network environment. The allocation of bandwidth to the plurality of devices 114 is based on determining, but not limited to, bandwidth demand value, assigned weighted value to each of plurality of devices 114, service level agreements (SLAs), resource availability, traffic characteristics, network conditions, historical usage patterns of the plurality of devices 114, priority levels for the plurality of devices 114, and the like.

In an example, the transmitting module may transmit allocated bandwidth information to the IBM 118 associated with the IGM 116. In an example, the system 102 may execute the BD unit 120 to trigger the IBM 118 to apply the allocated bandwidth for each of the plurality of devices 114 associated with the virtual network environment.

In an example, the receiving module may receive, from the IBM 118, a scaling factor corresponding to the allocated bandwidth, upon triggering the IBM 118. The received scaling factor may be transmitted to the IGM 116. Further, the switching module may switch back to the multi-beam management mode via the IBM 118 from, the multi-tier network entity management mode, based on the comparison result, upon transmitting the scaling factor to the IGM 116.

In an example, the comparing module may compare an amount of time corresponding to the allocation of bandwidth for each of the plurality of devices 114, with a pre-defined time. In an example, the comparing module may compare the bandwidth demand value associated with the aggregated bandwidth demand with the first pre-defined threshold value and the second pre-defined threshold value. Further, the allocating module may allocate progressively, bandwidth for each of the plurality of devices 114 associated with the virtual network environment, until a maximum throughput threshold value associated with the virtual network environment is attained, based on a comparison result.

In an example, the triggering module may trigger the IBM 118 to apply the allocated bandwidth for each of the plurality of devices 114 associated with the virtual network environment, based on progressively allocating bandwidth for each of the plurality of devices 114, until the maximum throughput threshold value is attained. Further, the receiving module may receive, from the IBM 118, a scaling factor corresponding to the progressively allocated bandwidth for each of the plurality of devices 114, upon triggering the IBM 118. The received scaling factor may be transmitted to the IGM 116. Further, the switching module may switch back, to the multi-beam management mode via the IBM 118 from, the multi-tier network entity management mode, based on the comparison result, upon transmitting the scaling factor to the IGM 116.

In an example, the first pre-defined threshold value associated with the physical network environment and the second pre-defined threshold value associated with the virtual network environment may be dynamically modified. The modification of the first pre-defined threshold value and the second pre-defined threshold value may be based on periodically determining, by a determining module, the bandwidth demand value associated with the aggregated bandwidth demand is within the first pre-defined threshold value associated with the physical network environment and the second pre-defined threshold value associated with the virtual network environment. Further, the modification of the first pre-defined threshold value and the second pre-defined threshold value may be based on determining, by the determining module, a beam adjusted value corresponding to the virtual network environment, based on determining the bandwidth demand value is within the first pre-defined threshold value and the second pre-defined threshold value.

Furthermore, the modification is based on modifying, by a modifying module, at least one of the first pre-defined threshold value and the second pre-defined threshold value based on exceeding the bandwidth demand value over the second pre-defined threshold value for allocating the bandwidth. The second pre-defined threshold value is modified to the beam adjusted value. Further, modifying incrementally the second pre-defined threshold value for each of a pre-defined time, based on the beam adjusted value. Upon modifying incrementally, the second pre-defined threshold value for each of a pre-defined time, a shifting module may progressively shift the at least one of the virtual network environment, and a beam associated with the virtual network environment to an adjusted slot of the bandwidth allocation.

FIG. 3 illustrates a block diagram representation of a system 102 comprising a plurality of gateways 104-1 and 104-2 associated with a bandwidth distributing (BD) unit 120, according to an example. The system 102 may utilize BD unit 120 for efficient bandwidth management for the virtual network operators (VNOs) and the network service providers (NSPs). The system 102 includes various interconnected components, each playing a crucial role in optimizing network performance and ensuring seamless user experience. In an example, the gateway 104-1 may include in-route group manager (IGM)-1 116-1, IGM-2 116-2, IGM-3 116-3, and in-route bandwidth manager (IBM)-1 118-1 coupled to the BD unit 120. Further, the gateway 104-1 may include internet protocol gateway (IPGW)-1 302-1, IPGW-2 302-2, IPGW-3 302-3, code rate organizer (CRO)-1 304-1, and out-route bandwidth manager (OBM)-1 306-1 coupled to the BD unit 120. Further, the gateway 104-2 may include IGM-4 116-4, IGM-5 116-5, IGM-6 116-6, and IBM-2 118-2 coupled to the BD unit 120. Further, the gateway 104-2 may include IPGW-4 302-4, IPGW-5 302-5, CRO-2 304-2, and OBM-2 306-2 coupled to the BD unit 120.

In the system 102, the BD unit 120 may be a centralized unit for the gateways 104-1 and 104-2. The BD unit 120 may collect real-time data from all connected gateways 104-1 and 104-2. Further, the BD unit 120 may analyze information regarding available bandwidth and current traffic demands. Using the comprehensive data, the BD unit 120 may dynamically allocates bandwidth to each gateway 104-1 and 104-2, ensuring appropriate utilization. Further, the system 102 may include the gateways (104-1 and 104-2), each responsible for managing specific aspects of network traffic. The IGM-1 116-1, IGM-2 116-2, IGM-3 116-3, associated with the gateway 104-1 may act as traffic directors, efficiently routing and prioritizing incoming traffic groups. Further, the IBM-1 118-1 may employ advanced deep packet inspection (DPI) technologies. The IBM-1 118-1 may analyze and prioritize incoming traffic based on specific needs and service requirements. Further, the IPGW-1 302-1, IPGW-2 302-2, IPGW-3 302-3 may serve as entry points for IP-based traffic, these gateways mediate its flow within the network, ensuring smooth and efficient transmission. Further, the CRO-1 304-1 may analyze individual traffic patterns and specific needs. The CRO-1 304-1 may dynamically optimize routing paths. Overseeing outgoing traffic, the OBM-1 306-1 may ensure efficient utilization of available bandwidth, preventing congestion and maintaining smooth data transmission.

Similarly, gateway 104-2 features additional IGM, IBM, IPGW, CRO, and OBM modules/units, fulfilling identical functions for managing additional incoming and outgoing traffic demands. The intricate network architecture hinges on the seamless interconnectivity between all components. Dedicated channels facilitate continuous communication between gateways and the BD unit 120, enabling real-time data exchange. The constant flow of information allows the BD unit 120 to make informed decisions about bandwidth allocation, ensuring efficient performance across the entire network.

Figure 4:
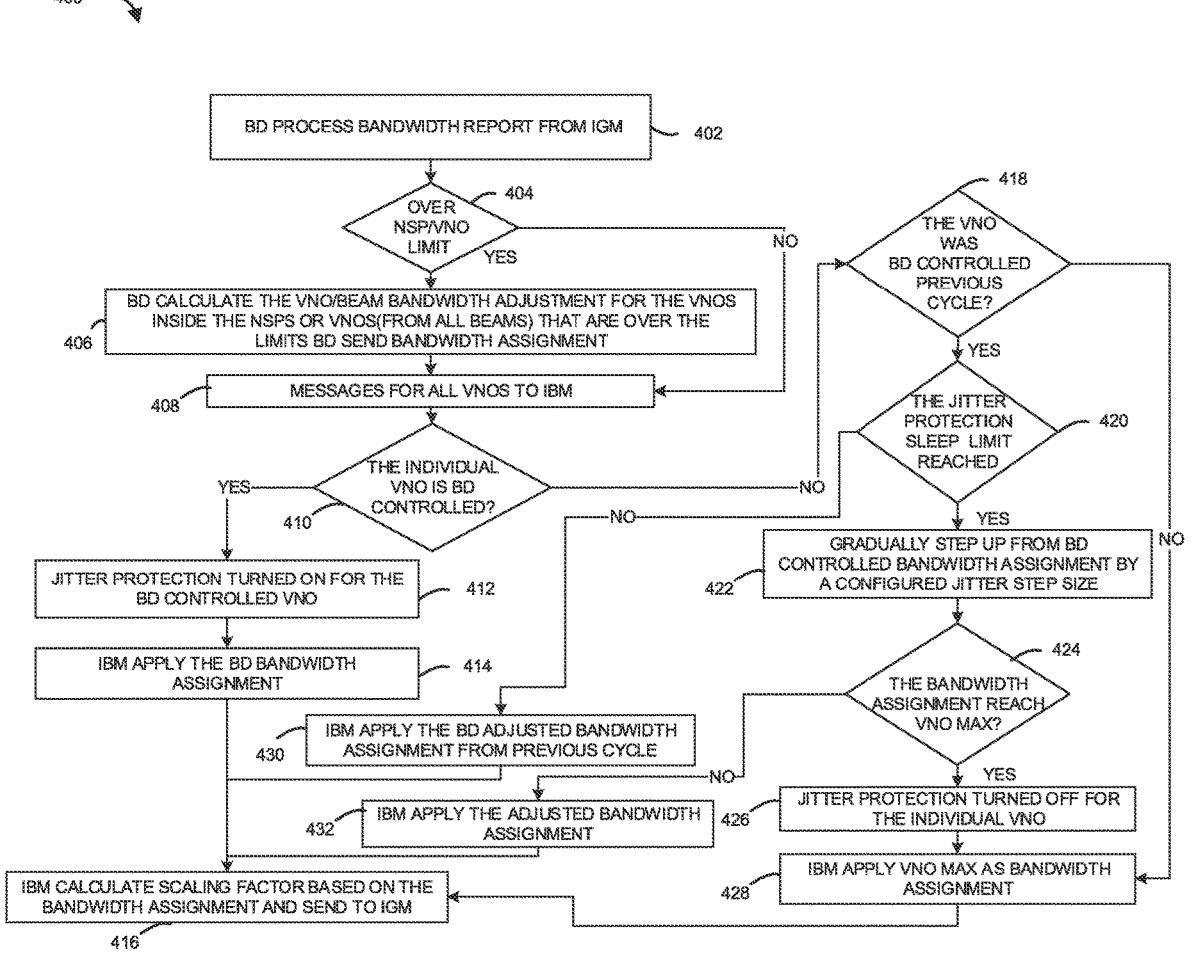
FIG. 4 illustrate a flow diagram representation of a method for managing a bandwidth flow control for a virtual network operator (VNO), according to an example.

FIG. 4 illustrate a flow diagram representation of a method 400 for managing a bandwidth flow control for a virtual network operator (VNO), according to an example.

At step 402, the method 400 may include processing, by the processor 202, a bandwidth report received from the IGM 116. For example, the BD unit 120 receives a report from the IGM 116 containing information about the current bandwidth usage of each VNO and beam. This report is crucial for understanding the overall network traffic and identifying potential bandwidth constraints.

At step 404, the method 400 may include comparing, by the processor 202, the reported VNO/beam bandwidth usage with the pre-defined limits set by the Network Service Provider (NSP) or the VNO itself. This step identifies the requested allocation of all VNO/beams exceeding their configured limit.

At step 406, the method 400 may include, if the requested allocation of all VNO/beams exceed the NSP/VNO limit, calculating, by the processor 202, a necessary bandwidth adjustment. This adjustment may involve increasing or decreasing bandwidth allocation to ensure fair and efficient resource utilization across the entire network. The BD unit 120 then transmits these adjusted bandwidth assignments to the IBM 118 for each VNO.

At step 408, the method 400 may include notifying, by the processor 202, all VNOs of their updated bandwidth assignments. The BD unit 120 uses the IBM 118 as a communication channel to inform the VNOs.

At step 410, the method 400 may include determining, by the processor 202, whether the individual VNO is directly controlled by the BD unit 120 or not. This distinction is crucial as it determines the level of control and potential need for additional configurations.

At step 412, the method 400 may include, enabling, by the processor 202, if the VNO is under BD control, jitter protection. This feature helps to minimize latency fluctuations and ensure a smoother user experience, particularly for voice and video applications.

At step 414, the method 400 may include, triggering, by the processor 202, the IBM 118 using the bandwidth adjustment messages for each VNO. The IBM 118 may then implement these adjustments by dynamically prioritizing and controlling traffic flows within the network to ensure that each VNO receives its allocated bandwidth.

At step 416, the method 400 may include receiving, by the processor 202, based on the bandwidth assignment, calculated scaling factor for each VNO from the IBM 118. This scaling factor is used by the IGM 116 to adjust its traffic shaping and prioritization algorithms, ensuring efficient resource utilization within each VNO's allocated bandwidth.

When the individual VNO is not directly controlled by the BD unit 120, then at step 418, the method 400 may include determining, by the processor 202, whether the individual VNO was under BD control during the previous cycle. This information is crucial for understanding the state of the VNO and determining the next course of action.

At step 420, the method 400 may include determining, by the processor 202, whether the VNO's jitter protection has been inactive for a period exceeding the pre-configured sleep limit, when the individual VNO was under BD control during the previous cycle at step 418. This limit helps ensure that jitter protection is only activated when necessary and minimizes potential performance impacts.

At step 422, the method 400 may include gradually incrementing, by the processor 202, if the VNO was previously BD controlled and the jitter protection sleep limit has been reached, the VNO's bandwidth allocation. This increase occurs in small increments, defined by the configured jitter step size, to minimize potential network disruptions and ensure smooth transition.

At step 424, the method 400 may include comparing, by the processor 202, the current VNO's bandwidth allocation with a pre-defined maximum limit. This ensures that the VNO's bandwidth does not exceed its allowed capacity and avoids potential network congestion.

At step 426, the method 400 may include deactivating, by the processor 202, the jitter protection feature, when the VNO's bandwidth assignment has reached its maximum limit. This is because jitter protection is effective when the VNO is operating below its full capacity and requires additional control to stabilize traffic flow.

At step 428, the method 400 may include assigning, by the processor 202, the VNO its maximum allowed bandwidth, when the VNO bandwidth has reached maximum limit. Further, at step 416, the method 400 may include receiving, by the processor 202, calculated scaling factor for each VNO from the IBM 118, based on assigning the VNO its maximum allowed bandwidth.

At step 430, the method 400 may include applying, by the processor 202, the adjusted bandwidth assignment calculated during the previous cycle, when the VNO was not previously BD controlled at step 418.

At step 432, the method 400 may include applying, by the processor 202, the current adjusted bandwidth assignment to the VNO. This adjusted bandwidth may be influenced by various factors, including overall network traffic, individual VNO usage, and pre-defined limits. Further, at step 416, the method 400 may include receiving, by the processor 202, calculated scaling factor for each VNO from the IBM 118, based on applying the current adjusted bandwidth assignment to the VNO.

Figure 5:
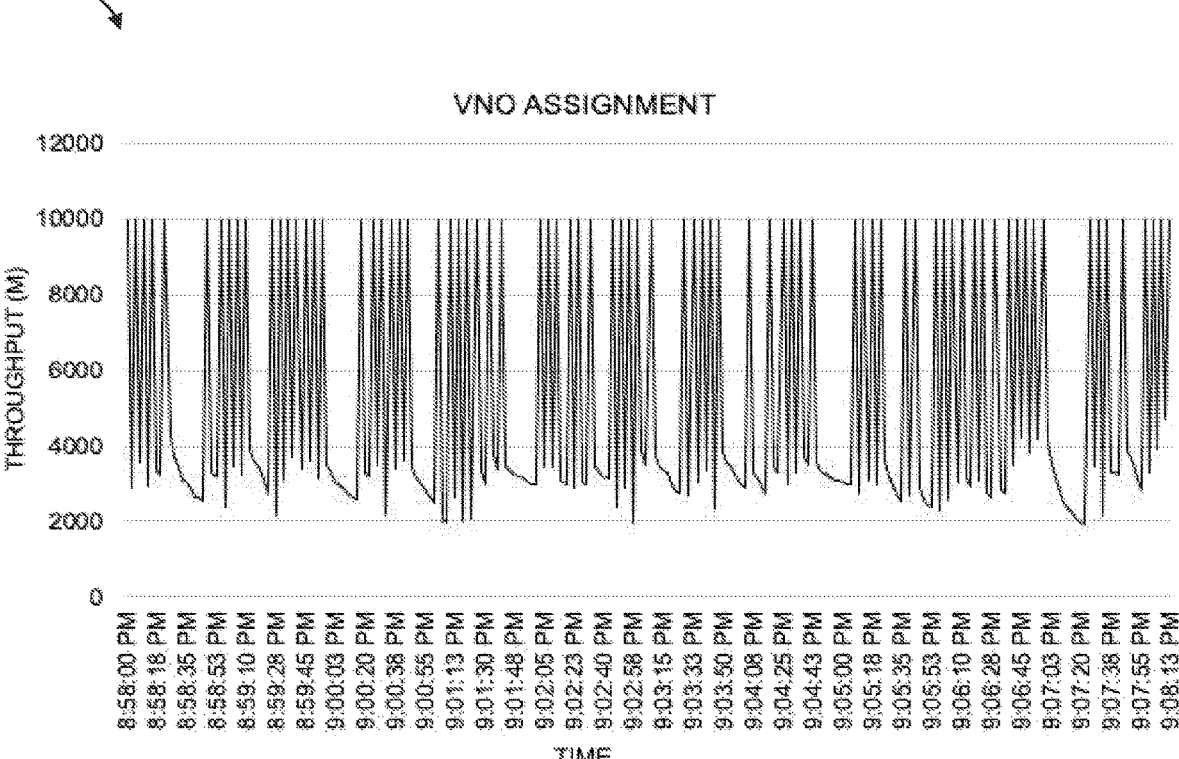
FIG. 5 illustrates a graph diagram representation of a multitier network service provider (NSP) jitter issues, according to an example.

FIG. 5 illustrates a graph diagram representation of a multitier network service provider (NSP) jitter issues representation graph 500, according to an example. This analysis dissects the underlying reasons for these challenges and proposes potential solutions for their mitigation. The Bandwidth Distribution (BD) unit 120 does not consistently impose its bandwidth allocation. This allows Virtual Network Operators (VNOs) to readily revert to their maximum allowed bandwidth (VNO Max) whenever BD control is deactivated, leading to network instability and jitter. Further, the BD algorithm dynamically assigns bandwidth to individual VNOs and beams within the multi-tier NSP architecture, taking into account factors such as demand, weight, and limitations. However, the BD control may not be perpetually active, turning on and off based on specific criteria. When BD lowers the allocated bandwidth for a VNO, the combined proposed bandwidth within the VNO or NSP is likely to fall below the allocated limit. This triggers BD to relinquish control, allowing the VNO to revert to its VNO Max setting. The In-Route Bandwidth Manager (IBM) 118 may primarily use VNO Max as the input for calculating the scaling factor in its multi-beam algorithm. This reliance on VNO Max can exacerbate jitter issues when BD control is absent.

The aforementioned observations highlight several key contributors to jitter in a scenario, where frequent BD control switches such as abrupt changes in allocated bandwidth due to BD activation and deactivation induce instability and performance fluctuations within the network. When BD is inactive, the primary input for IBM's scaling factor calculation is VNO Max, which does not reflect the actual bandwidth requirements of the VNO. This can lead to overprovisioning or under provisioning of resources, further contributing to jitter. The combined proposed bandwidth within a VNO or NSP can fluctuate rapidly, leading to unexpected changes in BD control and causing further instability.

To effectively address these issues and mitigate jitter, several approaches can be considered. For example, implementing mechanisms to facilitate gradual transitions between BD control and VNO Max can minimize the impact on network performance. Developing algorithms for IBM to calculate the scaling factor based on real-time traffic data, not just VNO Max, can lead to more accurate bandwidth allocation and reduced jitter. Utilizing advanced forecasting tools to predict future bandwidth requirements can help ensure smoother transitions and prevent sudden fluctuations in allocated resources. Implementing algorithms that adjust BD control based on specific performance metrics, such as jitter levels, can provide more precise and responsive control over bandwidth allocation. By addressing these root causes and implementing effective solutions, multi-tier NSPs can significantly improve network stability, reduce jitter, and deliver a more consistent and reliable user experience. This, in turn, can contribute to enhanced customer satisfaction and improved overall service quality.

Figure 6A:
FIG. 6A illustrates a graph diagram representation of a jittering protection result graph, according to an example.
Figure 6A:
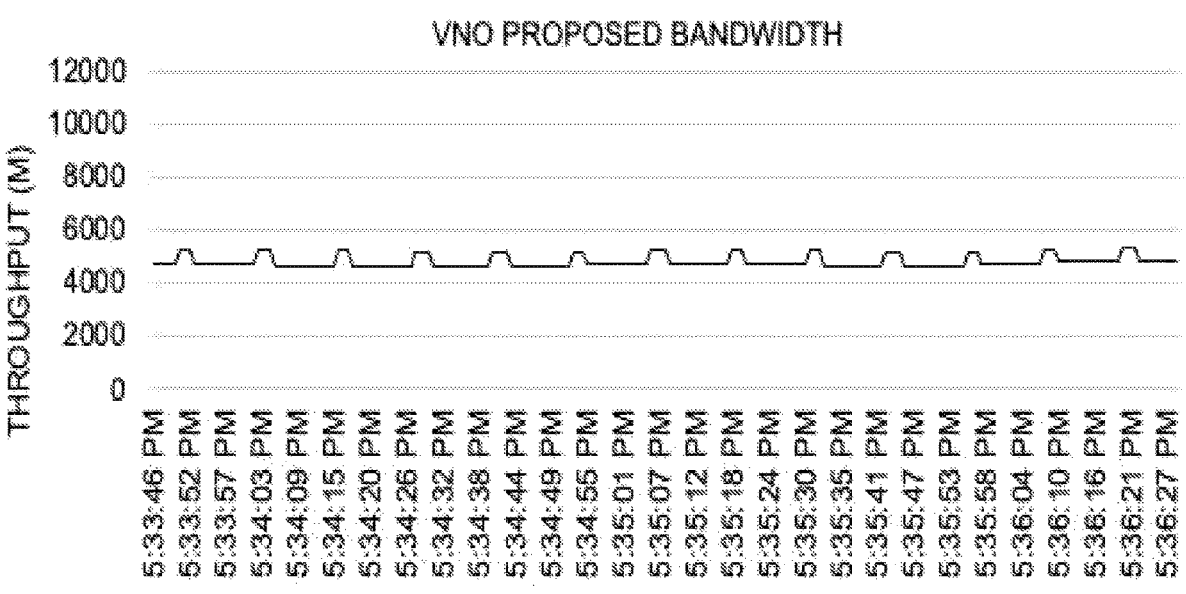

FIG. 6A illustrates a block diagram representation of a jittering protection result graph 600A, according to an example. The graph 600A provides results of jitter protection based on establishing a harmonious equilibrium between the multi-tier NSP algorithm and the IBM multi-beam algorithm. In normal network conditions, all Virtual Network Operators (VNOs) operate at their pinnacle, facilitated by the efficient IBM multi-beam algorithm. The proposed algorithm meticulously manages bandwidth allocation, ensuring appropriate resource utilization and smooth network operations. When the network encounters heavy traffic loads, the multi-tier NSP algorithm takes charge. During this period, the IBM multi-beam algorithm dynamically adapts and reacts to the BD's dynamic bandwidth assignments, even if these adjustments occur frequently. This collaborative approach ensures network stability amidst fluctuating bandwidth allocation. The graph 600A depicts smoothing results to VNO bandwidth allocation, avoiding the thrashing and large oscillation on the bandwidth amount given to the VNOs.

As the network traffic returns to normal levels, a smooth transition occurs, transitioning control from the multi-tier NSP algorithm back to the IBM multi-beam algorithm. During this phase, the IBM algorithm seamlessly exits BD control and resumes its primary operation mode, utilizing the VNO's maximum throughput as its input. To prevent sudden performance changes and stabilize the network during critical transitions, the jitter protection program automatically activates under specific conditions. The program enters action if the BD was in control during the previous cycle but relinquishes control in the current cycle, indicating a potential for instability due to the abrupt change in bandwidth allocation.

The jitter protection program deactivates under the following three scenarios such as for example, (1) when the BD regains control during the current cycle, signifying a return to a stable network state (2) when the increased VNO bandwidth assignment exceeds the configured VNO Max throughput, ensuring required resources are allocated to the VNO, and (3) when the pre-defined sleep cycles have elapsed, providing a grace period for the network to stabilize before fully entrusting control to the IBM multi-beam algorithm. Further, jitter control parameters include fine-tuning performance using a jitter step size. The jitter step size defines the incremental steps by which the VNO's bandwidth assignment is gradually increased towards its maximum limit during Jitter protection. Smaller step sizes ensure a smooth and gradual transition, reducing potential disruptions and network instability. Further, a jitter sleep time may determine the number of cycles that the VNO's bandwidth assignment remains unchanged after jitter protection activates. This sleep time allows the network to adapt to the initial change in bandwidth allocation before further adjustments are made, facilitating a more stable and controlled transition.

Exemplary Scenarios:

In an example scenario, an enterprise customer may request dedicated bandwidth in the network through an NSP (Network Service Provider). This customer can further have sub-customers under them, who can then create their own VNOs (Virtual Network Operators). This creates a hierarchical structure with specific rules governing interactions between each level. For example, oversubscription of NSPs is avoided, however customers can overlap bandwidth allocations for their sub-customers under the assumption that not everyone will be using the network simultaneously. This approach allows for efficient bandwidth utilization while ensuring dedicated resources for those who require them.

Another example scenario, there may be bandwidth allocation conflicts within a multi-tier network service provider (NSP) environment and introduces the jitter protection program as a solution to address these challenges. The current system utilizes two independent algorithms for bandwidth management: the system-level bandwidth distributor (BD) and the individual terminal-level In-route bandwidth management (IBM). This structure, while offering benefits, suffers from conflicting interactions between the algorithms, leading to jitter and performance instability for VNOs (Virtual Network Operators) and their customers.

When network congestion occurs, the BD triggers adjustments to limit overall bandwidth requests. This process can inadvertently exceed the desired allocation for specific VNOs, prompting counter-adjustments by IBM to maintain VNO limits. This back-and-forth interaction creates jitter and instability. The jitter disrupts VNO performance and negatively affects service quality for their customers. Additionally, the inconsistent bandwidth allocation hinders their ability to manage resources effectively. The jitter protection program may act as a mediating layer between BD and IBM, ensuring smooth transitions in bandwidth allocation and reducing jitter. The jitter protection program operates dynamically, activating when BD relinquishes control, however, resumes control within the same cycle. The jitter protection program includes two key parameters such as, for example, (1) step size: determines the gradual increase in bandwidth permitted for each VNO at each step, preventing abrupt changes and reducing jitter, (2) sleep time: controls the duration between steps, allowing for network stabilization and preventing overshooting VNO bandwidth limits.

Yet another example scenario includes combining scaling factor algorithm and multi-tier NSP/VNO bandwidth sharing algorithm and apply the algorithms to the VNOs. The configured max of VNO may be replaced by the adjusted proposed bandwidth when the aggregated total proposed bandwidth request of VNO/beam exceeds the max limit. In some implementations, the replacement generates the jittering issue. To better illustrate the jittering issue, simulation may be conducted based on the below parameter setting:

number of beam=1
number of IGM=1
number of In-routes in IGM: 4×1024 Ksps, 4×2048 Ksps
number of NSP=1
number of VNO per NSP=1
MODCOD=2 bit/symbol
demand of VNO=15 Mbps
min throughput of VNO=0 Mbps
max throughput of VNO=10 Mbps
max of NSP/beam=1 Mbps
number of terminals per VNO=3 service plan of terminals=1 Mbps
min and max of scaling factor:
Fmin=0.1, Fmax=2
Gmin=0.1, Gmax=1
Fpmin=0.1, Fpmax=1
update period of scaling factor algorithm=8 frames
update period of multi-tier NSP/VNO bandwidth sharing algorithm=111
frames (5 second)

Based on the parameter setting, the IGM 116 may include enough bandwidth to satisfy the demand of the VNO. The max limit of NSP/beam may be 1 Mbps, which is much smaller than the proposed bandwidth (10 Mbps). Thus, the multi-tier NSP/VNO bandwidth sharing algorithm would adjust proposed bandwidth to 1 Mbps. When the proposed bandwidth is within the max limit of NSP/beam, the bandwidth adjustment may not be imposed on IBM 118 or BD unit 120. Then the VNO could achieve its configured max (10 Mbps).

Figure 6B:
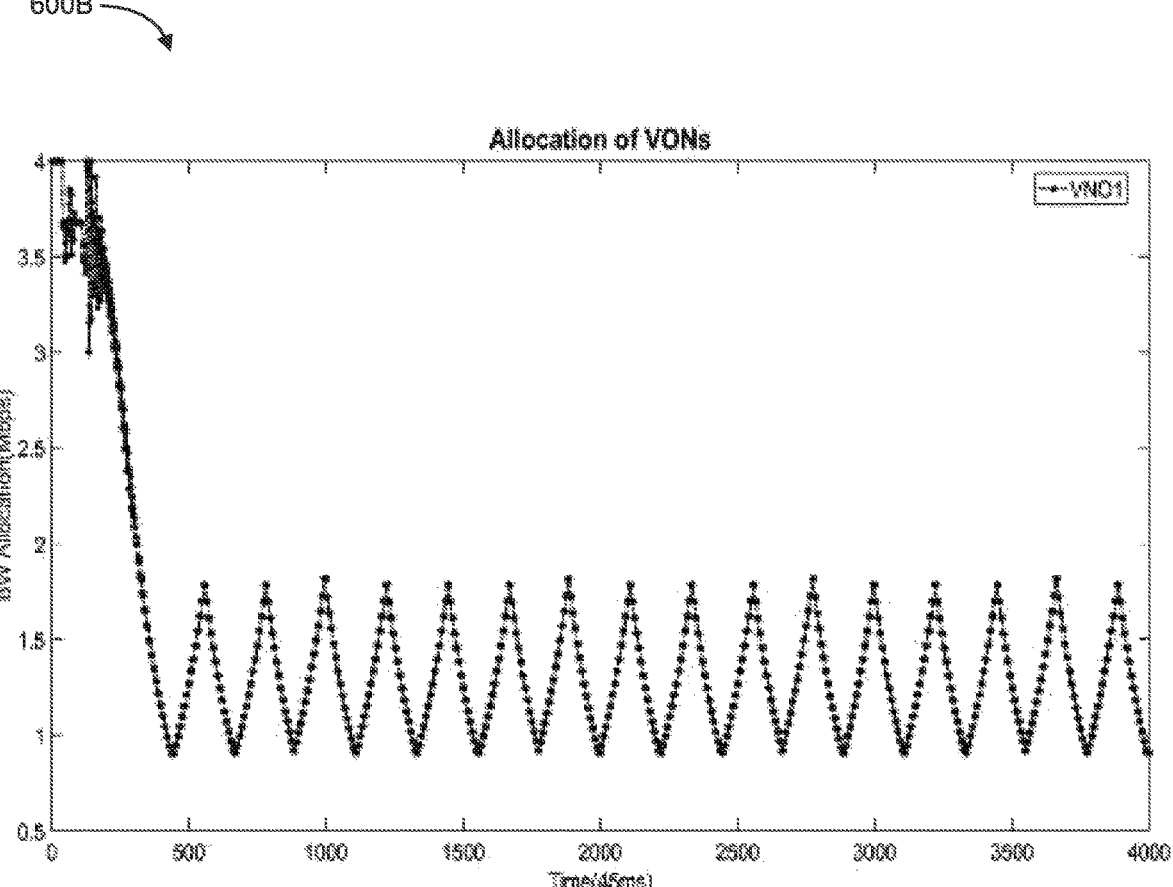
FIG. 6B illustrates a graph diagram representation of a bandwidth allocation graph for virtual network operators (VNOs), according to an example.
Figure 6C:
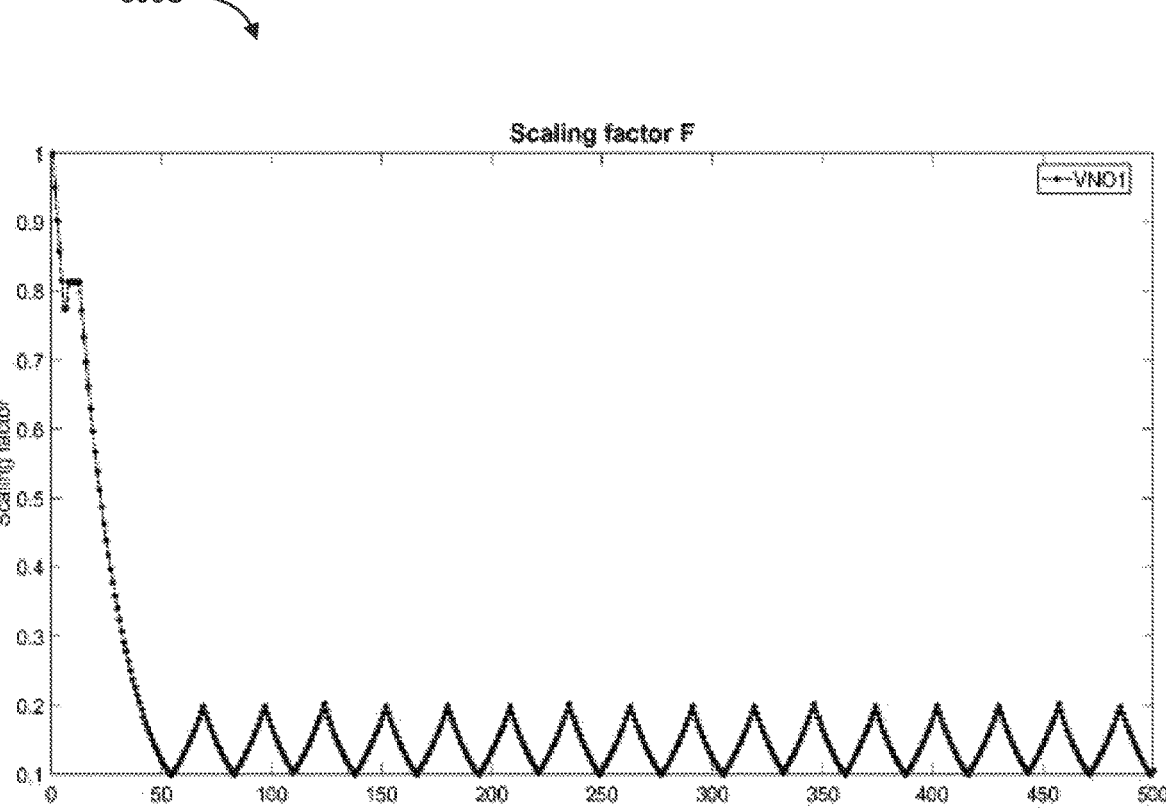
FIG. 6C illustrates a graph diagram representation of a scaling factor graph of the VNOs, according to an example.

FIGS. 6B and 6C depict that, the bandwidth allocation of the VNO/beam may be jumping back and forth dramatically (min=0.9, max=1.8) because of the major difference between adjusted proposed bandwidth (1 Mbps) and the configured max(10 Mbps), using the graphs 600B and 600C, respectively. To solve the jittering issue, the protection scheme may be able to let VNO hold the adjusted proposed bandwidth for a few cycles when the aggregated total proposed bandwidth of VNO/beam exceeds the max limit. In addition, when the aggregated total proposed bandwidth of VNO/beam is within the max limit, the solution may let VNO move up gradually towards the configured max. Based on the above two guidelines, the following scheme could be used to solve the jittering issue.

VNObeam_proposed (t1, i) (i=1, 2, 3 . . . N, N is total num of VNO/beam) is proposed bandwidth of VNO/beam from IBM before the bandwidth adjustment.

ThresholdValue (t2, i) (i=1, 2, 3 . . . N, N is total num of VNO/beam) is used to compare with short term throughput moving average of VNO in scaling factor calculation.

AdjTarThrputVno (t2, i) (i=1, 2, 3 . . . N, N is total num of VNO/beam) is adjusted target slot allocation of VNO, which is calculated based on the configured max throughput of VNO.

VNObeam_adjusted (t3, i) (i=1, 2, 3 . . . N, N is total num of VNO/beam) is adjusted proposed bandwidth of VNO/beam after NSP/beam, NSP/VNO system wide bandwidth adjustment.

VNObeam_adjusted_hold (t4, i) (i=1, 2, 3 . . . N, N is total num of VNO/beam) is adjusted proposed bandwidth of VNO/beam, which would be hold for 3 seconds, which is 66 frames.

ToleranceFactor=0.99

Adjusted_value(i) (i=1, 2, 3 . . . N, N is total num of VNO/beam) is recent adjusted proposed bandwidth of VNO/beam which is bigger than ThresholdValue(t2−1, i)

Difference_value(i) (i=1, 2, 3 . . . N, N is total num of VNO/beam) is the difference between Adjusted_value (i) and ThresholdValue(t2−1, i)

Step_value(i) (i=1, 2, 3 . . . N, N is total num of VNO/beam) is the step value when VNO moves up gradually towards the adjusted target slot allocation of VNO Adjust_duration=167 cycles, each cycle is 8 frames, total time is 1 min. VNO will take 1 min to move up gradually towards the adjusted target slot allocation of VNO When t2=1, VNObeam_adjusted(t2, i)=configured max Throughput of VNO/beam Unit of t1 is 1 frame (period of in-route bandwidth allocation algorithm), unit of t2 is 8 frames (period of scaling factor algorithm), unit of t3 is 22 frames (period of multi-tier NSP/VNO bandwidth sharing algorithm), unit of t4 is 66 frames (3 cycles of multi-tier NSP/VNO).

At step 1, the aggregated total proposed bandwidth request of VNO/beam is within the NSP/beam or NSP/VNO system wide limit, the VNObeam_adjusted will take its last value. At step 2, proposed bandwidth of VNO/beam is bigger than 99% of the adjusted proposed bandwidth of VNO/beam, which means all VNO/beam might still offend the max limit. Then threshold value will take VNObeam_adjusted. At step 3, any proposed BW of VNO/beam is less than VNObeam_adjusted, all VNO/beam will move up gradually to adjusted target slot allocation of VNO. It will take each VNO/beam 1 min (or 167 cycles) to achieve the new value, period of each cycle is 8 frames. At step 4, when threshold value is still smaller than VNObeam_adjusted, the threshold may move one step for each cycle. At step 5: when threshold value with one step is bigger than VNObeam_adjusted, the threshold value may not be greater than VNObeam_adjusted. Further, at step 6: VNO may move down to smaller value based on the scaling factor algorithm, the speed of moving down depends on the scaling factor algorithm. Furthermore, at step 7: VNO may stay at the latest adjusted proposed bandwidth (VNObeam_adjusted) for example, 3 seconds.

Figure 7:
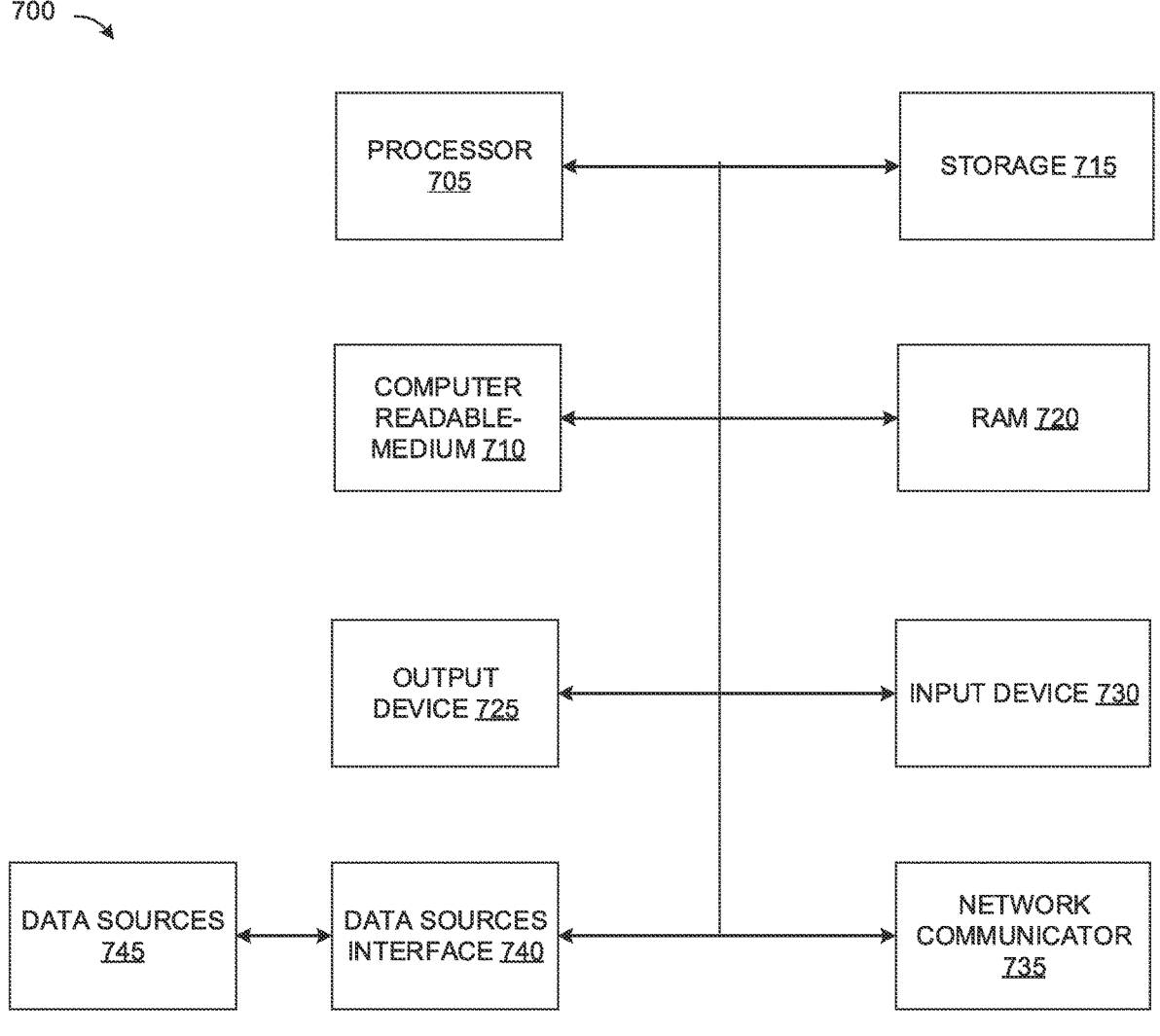
FIG. 7 illustrates a block diagram representation of a hardware platform for implementation of a computer system, according to an example.

FIG. 7 illustrates a block diagram representation of a hardware platform for implementation of a computer system 700, according to an example. The computer system 700 may be part of or any one of the systems 102, the gateway 104, the router 110, the IGM 116, the IBM 118, and the BD unit 120, and the network transport modems to perform the functions and features described herein. For the sake of brevity, construction and operational features of the system 102 which are explained in detail above are not explained in detail herein. Particularly, computing machines such as but not limited to internal/external server clusters, quantum computers, desktops, laptops, smartphones, tablets, and wearables which may be used to execute the system 102 or may have the structure of the hardware platform 700. As illustrated, the hardware platform 700 may include additional components not shown, and that some of the components described may be removed and/or modified. For example, a computer system with multiple GPUs may be located on external-cloud platforms including web services, or internal corporate cloud computing clusters, or organizational computing resources, and the like.

The hardware platform 700 may be a computer system such as the system 102 that may be used with the embodiments described herein. The computer system may represent a computational platform that includes components that may be in a server or another computer system. The computer system may execute, by the processor 705 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 705 that executes software instructions or code stored on a non-transitory computer-readable storage medium 710 to perform methods of the present disclosure.

The instructions on the computer-readable storage medium 710 are read and stored the instructions in storage 715 or in random access memory (RAM). The storage 715 may provide a space for keeping static data where at least some instructions could be stored for later execution. The stored instructions may be further compiled to generate other representations of the instructions and dynamically stored in the RAM such as RAM 720. The processor 505 may read instructions from the RAM 720 and perform actions as instructed.

The computer system may further include the output device 725 to provide at least some of the results of the execution as output including, but not limited to, visual information to users, such as external agents. The output device 725 may include a display on computing devices and virtual reality glasses. For example, the display may be a mobile phone screen or a laptop screen. GUIs and/or text may be presented as an output on the display screen. The computer system may further include an input device 730 to provide a user or another device with mechanisms for entering data and/or otherwise interact with the computer system. The input device 730 may include, for example, a keyboard, a keypad, a mouse, or a touchscreen. Each of these output device 725 and input device 730 may be joined by one or more additional peripherals. For example, the output device 725 may be used to display the results.

A network communicator 735 may be provided to connect the computer system to a network and in turn to other devices connected to the network including other clients, servers, data stores, and interfaces, for instance. A network communicator 735 may include, for example, a network adapter such as a LAN adapter or a wireless adapter. The computer system may include a data sources interface 740 to access the data source 745. The data source 745 may be an information resource. As an example, a database of exceptions and rules may be provided as the data source 745. Moreover, knowledge repositories and curated data may be other examples of the data source 745.

FIG. 8 illustrates a flow diagram representation of a method 800 for dynamic bandwidth allocation and jitter handling in multi-tiered satellite networks, according to an example. The disclosed method 800 may be performed by one or more components of system 102, the gateway 104, the router 110, the IGM 116, the IBM 118, and the BD unit 120 disclosed herein. For example, with reference to FIG. 2, the steps disclosed herein may be performed by a processor. In yet another example, some of the steps disclosed herein may be performed by the gateway 104, or the router 110, or the IGM 116, or the IBM 118, and/or the BD unit 120.

At step 802, the method 800 may include retrieving periodically, by a processor 202 associated with a bandwidth distributing (BD) unit 120 of a system 102, a bandwidth report from an in-route group manager (IGM) 116 associated with each of at least one of a first network gateway associated with a first network path and a second network gateway associated with a second network path. The bandwidth report includes a request, from the plurality of devices 114, for bandwidth on at least one of a physical network environment associated with the first network path and a virtual network environment associated with the second network path. The BD unit 120 may be communicatively coupled to at least one of the first network gateway and the second network gateway.

At step 804, the method 800 may include analyzing, by the processor 202, data indicating a status of the virtual network environment and the physical network environment. The status corresponds to an aggregated bandwidth demand for the virtual network environment and the physical network environment.

At step 806, the method 800 may include comparing, by the processor 202, a bandwidth demand value associated with the aggregated bandwidth demand, with a first pre-defined threshold value associated with the physical network environment and a second pre-defined threshold value associated with the virtual network environment.

At step 808, the method 800 may include switching, by the processor 202, from, a multi-beam management mode corresponding to an in-route bandwidth manager (IBM) 118 associated with the IGM 116, to a multi-tier network entity management mode associated with the BD unit 120, based on a comparison result.

At step 810, the method 800 may include determining, by the processor 202, a bandwidth adjustment parameter corresponding to at least one of the virtual network environment, and a beam associated with the virtual network environment, based on the switching the mode. The bandwidth adjustment parameter may be determined for the virtual network environment within at least one of the physical network environment and the virtual network environment.

At step 812, the method 800 may include allocating, by the processor 202, a bandwidth for each of the plurality of devices 114 associated with the virtual network environment and transmit allocated bandwidth information to an in-route bandwidth manager (IBM) 118 associated with the IGM 116.

At step 814, the method 800 may include triggering, by the processor 202, the IBM 118 to apply the allocated bandwidth for each of the plurality of devices 114 associated with the virtual network environment.

At step 816, the method 800 may include receiving, by the processor 202, from the IBM 118, (i.e., scaling factor is calculated by IBM 118 and then the scaling factor is sent to the IGM 116) a scaling factor corresponding to the allocated bandwidth, upon triggering the IBM 118. The received scaling factor is transmitted to the IGM 116.

At step 818, the method 800 may include switching, by the processor 202, back, to the multi-beam management mode via the IBM 118 from the multi-tier network entity management mode, based on the comparison result, upon transmitting the scaling factor to the IGM 116.

The order in which the method 800 is described is not intended to be construed as a limitation, and any number of the described method blocks may be combined or otherwise performed in any order to implement the method 800 or an alternate method. Additionally, individual blocks may be deleted from the method 800 without departing from the spirit and scope of the ongoing description. Furthermore, the method 800 may be implemented in any suitable hardware, software, firmware, or a combination thereof, that exists in the related art or that is later developed. The method 800 describes, without limitation, the implementation of the system 102. A person of skill in the art will understand that method 800 may be modified appropriately for implementation in various manners without departing from the scope and spirit of the ongoing description.

Various examples of the present disclosure provide systems and methods for a dynamic bandwidth allocation and jitter handling in multi-tiered satellite networks such as virtual communication networks and/or physical communication networks. The system tackles the issue of bandwidth allocation jittering within a specific network scenario. By precisely controlling modifications in bandwidth usage and facilitating smooth transitions between enforced and configured limits, the algorithm aims to optimize network performance and maintain consistent and efficient bandwidth utilization for both VNOs and NSPs. The system effectively handles the dynamic nature of bandwidth demand, reducing disruptions and fluctuations in network performance. The virtual network operators (VNOs) may leverage existing infrastructure, while NSPs can optimize resource utilization. Both VNOs and NSPs can provide quality of service (QoS) guarantees and mitigate latency issues, leading to a more reliable and performant service for the users. The jitter protection algorithm may be expected to significantly reduce jitter and improve network stability in multi-tier NSP environments. This may lead to improved performance for VNOs and a better user experience.

By mitigating conflicts between the BD and IBM algorithms, the system ensures smooth transitions and minimizes jitter, resulting in a more stable and reliable network environment. This leads to improved performance for VNOs and the users, with reduced latency and fewer service disruptions. The system is adaptable to changing network conditions. The system can dynamically activate or deactivate based on traffic levels and congestion, ensuring efficient performance at all times. The jitter protection in the present disclosure enables a stable network environment by eliminating abrupt changes in bandwidth allocation, leading to improved performance for virtual network operators (VNOs) and the associated users. The present disclosure enables consistent bandwidth allocation which allows the VNOs to manage resources effectively and deliver high-quality service to their customers. The jitter protection balances the needs of individual VNOs with the overall network capacity, ensuring efficient utilization of resources. The step size and sleep time parameters may be further refined based on specific network environments and requirements. Continuous improvements may be performed to the logic and decision-making capabilities of the jitter protection module for greater efficiency and adaptability.

One of ordinary skill in the art will appreciate that techniques consistent with the ongoing description are applicable in other contexts as well without departing from the scope of the ongoing description.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for managing handoff.

It should also be appreciated that the systems and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or non-volatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as GEO an LEO satellite network systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

What has been described and illustrated herein are examples of the implementation along with some variations. The terms, descriptions, and figures used herein are set forth by way of illustration only and are not meant as limitations. Many variations are possible within the scope of the implementations, which is intended to be defined by the following claims—and their equivalents—in which all terms are meant in their broadest reasonable sense unless otherwise indicated.

The invention claimed is:

1. A system comprising:

a first network path comprising a physical network environment, wherein the physical network environment comprises a first network gateway associated with the first network path;

a second network path comprising a virtual network environment, wherein the virtual network environment comprises a second network gateway associated with the second network path;

a bandwidth distributing (BD) unit, communicatively coupled to at least one of the first network gateway and the second network gateway, wherein the BD unit comprises a multi-tier network entity management mode, wherein the BD unit comprises:

a processor;

a memory coupled to the processor, wherein the memory comprises processor-executable instructions, which on execution, cause the processor to:

retrieve, periodically, a bandwidth report from an in-route group manager (IGM) associated with each of at least one of the first network gateway and the second network gateway, wherein the bandwidth report comprises a request, from a plurality of devices, for bandwidth on at least one of the physical network environment and the virtual network environment;

analyze data indicating a status of the virtual network environment and the physical network environment, wherein the status corresponds to an aggregated bandwidth demand for the virtual network environment and the physical network environment;

compare a bandwidth demand value associated with the aggregated bandwidth demand, with a first pre-defined threshold value associated with the physical network environment and a second pre-defined threshold value associated with the virtual network environment;

switch from, a multi-beam management mode corresponding to an in-route bandwidth manager (IBM) associated with the IGM, to the multi-tier network entity management mode, based on a comparison result;

determine a bandwidth adjustment parameter corresponding to at least one of the virtual network environment, and a beam associated with the virtual network environment, based on switching to the multi-tier network entity management mode, wherein the bandwidth adjustment parameter is determined for the virtual network environment within at least one of the physical network environment and the virtual network environment;

allocate a bandwidth for each of the plurality of devices associated with the virtual network environment, and transmit allocated bandwidth information to an in-route bandwidth manager (IBM) associated with the IGM;

trigger the IBM to apply the allocated bandwidth for each of the plurality of devices associated with the virtual network environment;

receive, from the IBM, a scaling factor corresponding to the allocated bandwidth, upon triggering the IBM, wherein the received scaling factor is transmitted to the IGM; and switch back to the multi-beam management mode via the IBM from, the multi-tier network entity management mode, based on the comparison result, upon transmitting the scaling factor to the IGM.

2. The system of claim 1, wherein the processor is to:

compare an amount of time corresponding to the allocated bandwidth for each of the plurality of devices, with a pre-defined time;

compare the bandwidth demand value associated with the aggregated bandwidth demand with the first pre-defined threshold value and the second pre-defined threshold value;

allocate progressively, bandwidth for each of the plurality of devices associated with the virtual network environment, until a maximum throughput threshold value associated with the virtual network environment is attained, based on a comparison result;

trigger the IBM to apply the allocated bandwidth for each of the plurality of devices associated with the virtual network environment, based on the progressively allocated bandwidth for each of the plurality of devices, until the maximum throughput threshold value is attained;

receive, from the IBM, a scaling factor corresponding to the progressively allocated bandwidth for each of the plurality of devices, upon triggering the IBM, wherein the received scaling factor is transmitted to the IGM; and switch back, to the multi-beam management mode via the IBM from, the multi-tier network entity management mode, based on the comparison result, upon transmitting the scaling factor to the IGM.

3. The system of claim 1, wherein the first pre-defined threshold value associated with the physical network environment and the second pre-defined threshold value associated with the virtual network environment are dynamically modified based on:

determining, periodically, by the processor, the bandwidth demand value associated with the aggregated bandwidth demand is within the first pre-defined threshold value associated with the physical network environment and the second pre-defined threshold value associated with the virtual network environment;

determining, by the processor, a beam adjusted value corresponding to the virtual network environment, based on determining the bandwidth demand value is within the first pre-defined threshold value and the second pre-defined threshold value; and modifying, by the processor, at least one of the first pre-defined threshold value and the second pre-defined threshold value based on:

exceeding the bandwidth demand value over the second pre-defined threshold value for allocating the bandwidth, wherein the second pre-defined threshold value is modified to the beam adjusted value; and modifying, incrementally the second pre-defined threshold value for each of a pre-defined time, based on the beam adjusted value.

4. The system of claim 3, wherein, upon modifying incrementally the second pre-defined threshold value for each of the pre-defined time, the processor is to progressively shift the at least one of the virtual network environment, and a beam associated with the virtual network environment to an adjusted slot of the bandwidth allocation.

5. The system of claim 1, wherein the physical network environment comprises network service providers (NSPs) and the virtual network environment comprises virtual network operators (VNOs).

6. The system of claim 1, wherein the status of the virtual network environment and the physical network environment corresponds to at least one of the aggregated bandwidth demand for the virtual network environment and the physical network environment, a throughput for the virtual network environment and the physical network environment, and an available bandwidth for each of the virtual network environment and the physical network environment.

7. The system of claim 1, wherein switching from the multi-beam management mode to the multi-tier network entity management mode, is based on determining a traffic value associated with a traffic in the allocated bandwidth for the plurality of devices, is greater than a traffic threshold value.

8. The system of claim 1, wherein the allocation of bandwidth to the plurality of devices is based on determining at least one of a bandwidth demand value, an assigned weighted value to each of plurality of devices, service level agreements (SLAs), a resource availability, traffic characteristics, network conditions, historical usage patterns of the plurality of devices, and priority levels for the plurality of devices.

9. A method comprising:

retrieving, by a processor associated with a bandwidth distributing (BD) unit, periodically, a bandwidth report from an in-route group manager (IGM) associated with each of at least one of a first network gateway associated with a first network path and a second network gateway associated with a second network path, wherein the bandwidth report comprises a request, from a plurality of devices, for bandwidth on at least one of a physical network environment associated with the first network path and a virtual network environment associated with the second network path, and wherein the BD unit is communicatively coupled to at least one of the first network gateway and the second network gateway;

analyzing, by the processor, data indicating a status of the virtual network environment and the physical network environment, wherein the status corresponds to an aggregated bandwidth demand for the virtual network environment and the physical network environment;

comparing, by the processor, a bandwidth demand value associated with the aggregated bandwidth demand, with a first pre-defined threshold value associated with the physical network environment and a second pre-defined threshold value associated with the virtual network environment;

switching, by the processor, from a multi-beam management mode corresponding to an in-route bandwidth manager (IBM) associated with the IGM, to a multi-tier network entity management mode associated with the BD unit, based on a comparison result;

determining, by the processor, a bandwidth adjustment parameter corresponding to at least one of the virtual network environment, and a beam associated with the virtual network environment, based on switching to the multi-tier network entity management mode, wherein the bandwidth adjustment parameter is determined for the virtual network environment within at least one of the physical network environment and the virtual network environment;

allocating, by the processor, a bandwidth for each of the plurality of devices associated with the virtual network environment, and transmit allocated bandwidth information to an in-route bandwidth manager (IBM) associated with the IGM;

triggering, by the processor, the IBM to apply the allocated bandwidth for each of the plurality of devices associated with the virtual network environment;

receiving, by the processor, from the IBM, a scaling factor corresponding to the allocated bandwidth, upon triggering the IBM, wherein the received scaling factor is transmitted to the IGM; and switching, by the processor, back to the multi-beam management mode via the IBM from the multi-tier network entity management mode, based on the comparison result, upon transmitting the scaling factor.

10. The method of claim 9, further comprises:

comparing, by the processor, an amount of time corresponding to the allocated bandwidth for each of the plurality of devices, with a pre-defined time;

comparing, by the processor, the bandwidth demand value associated with the aggregated bandwidth demand with the first pre-defined threshold value and the second pre-defined threshold value;

allocating, by the processor, progressively, bandwidth for each of the plurality of devices associated with the virtual network environment, until a maximum throughput threshold value associated with the virtual network environment is attained, based on a comparison result;

triggering, by the processor, the IBM to apply the allocated bandwidth for each of the plurality of devices associated with the virtual network environment, based on the progressively allocated bandwidth for each of the plurality of devices, until the maximum throughput threshold value is attained;

receiving, by the processor, from the IBM, a scaling factor corresponding to the progressively allocated bandwidth for each of the plurality of devices, upon triggering the IBM, wherein the received scaling factor is transmitted to the IGM; and switching, by the processor, back to the multi-beam management mode via the IBM from the multi-tier network entity management mode, based on the comparison result, upon transmitting the scaling factor.

11. The method of claim 9, wherein the first pre-defined threshold value associated with the physical network environment and the second pre-defined threshold value associated with the virtual network environment are dynamically modified based on:

determining, by the processor, periodically, the bandwidth demand value associated with the aggregated bandwidth demand, is within the first pre-defined threshold value associated with the physical network environment and the second pre-defined threshold value associated with the virtual network environment;

determining, by the processor, a beam adjusted value corresponding to the virtual network environment, based on determining the bandwidth demand value is within the first pre-defined threshold value and the second pre-defined threshold value; and modifying, by the processor, at least one of the first pre-defined threshold value and the second pre-defined threshold value based on:

exceeding the bandwidth demand value over the second pre-defined threshold value for allocating the bandwidth, wherein the second pre-defined threshold value is modified to the beam adjusted value; and modifying, by the processor, incrementally the second pre-defined threshold value for each of a pre-defined time, based on the beam adjusted value.

12. The method of claim 11, wherein, upon modifying incrementally the second pre-defined threshold value for each of the pre-defined time, the processor is to progressively shift the at least one of the virtual network environment, and a beam associated with the virtual network environment to an adjusted slot of the bandwidth allocation.

13. The method of claim 9, wherein the physical network environment comprises network service providers (NSPs), and the virtual network environment comprises virtual network operators (VNOs).

14. The method of claim 9, wherein the status of the virtual network environment and the physical network environment corresponds to at least one of the aggregated bandwidth demand for the virtual network environment and the physical network environment, a throughput for the virtual network environment and the physical network environment, and an available bandwidth for each of the virtual network environment and the physical network environment.

15. The method of claim 9, wherein switching from the multi-beam management mode to the multi-tier network entity management mode, is based on determining, by the processor, a traffic value associated with a traffic in the allocated bandwidth for the plurality of devices, is greater than a traffic threshold value.

16. The method of claim 9, wherein the allocation of bandwidth to the plurality of devices is based on determining, by the processor, at least one of a bandwidth demand value, an assigned weighted value to each of plurality of devices, service level agreements (SLAs), a resource availability, traffic characteristics, network conditions, historical usage patterns of the plurality of devices, and priority levels for the plurality of devices.

17. A non-transitory computer-readable medium comprising machine-readable instructions that are executable by a processor to:

retrieve, via a bandwidth distributing (BD) unit, periodically, a bandwidth report from an in-route group manager (IGM) associated with each of at least one of a first network gateway associated with a first network path and a second network gateway associated with a second network path, wherein the bandwidth report comprises a request, from a plurality of devices, for bandwidth on at least one of a physical network environment associated with the first network path and a virtual network environment associated with the second network path, and wherein the BD unit is communicatively coupled to at least one of the first network gateway and the second network gateway;

analyze data indicating a status of the virtual network environment and the physical network environment, wherein the status corresponds to an aggregated bandwidth demand for the virtual network environment and the physical network environment;

compare a bandwidth demand value associated with the aggregated bandwidth demand, with a first pre-defined threshold value associated with the physical network environment and a second pre-defined threshold value associated with the virtual network environment;

switch, from a multi-beam management mode corresponding to an in-route bandwidth manager (IBM) associated with the IGM, to a multi-tier network entity management mode associated with the BD unit, based on a comparison result;

determine a bandwidth adjustment parameter corresponding to at least one of the virtual network environment, and a beam associated with the virtual network environment, based on switching to the multi-tier network entity management mode, wherein the bandwidth adjustment parameter is determined for the virtual network environment within at least one of the physical network environment and the virtual network environment;

allocate a bandwidth for each of the plurality of devices associated with the virtual network environment, and transmit allocated bandwidth information to an in-route bandwidth manager (IBM) associated with the IGM;

trigger the IBM to apply the allocated bandwidth for each of the plurality of devices associated with the virtual network environment;

receive, from the IBM, a scaling factor corresponding to the allocated bandwidth, upon triggering the IBM, wherein the received scaling factor is transmitted to the IGM; and switch, by the processor, back, to the multi-beam management mode via the IBM from the multi-tier network entity management mode, based on the comparison result, upon transmitting the scaling factor.

18. The non-transitory computer-readable medium of claim 17, the processor is to:

compare an amount of time corresponding to the allocated of bandwidth for each of the plurality of devices, with a pre-defined time;

compare the bandwidth demand value associated with the aggregated bandwidth demand with the first pre-defined threshold value and the second pre-defined threshold value;

allocate progressively, bandwidth for each of the plurality of devices associated with the virtual network environment, until a maximum throughput threshold value associated with the virtual network environment is attained, based on a comparison result;

trigger the IBM to apply the allocated bandwidth for each of the plurality of devices associated with the virtual network environment, based on the progressively allocated bandwidth for each of the plurality of devices, until the maximum throughput threshold value is attained;

receive, from the IBM, a scaling factor corresponding to the progressively allocated bandwidth for each of the plurality of devices, upon triggering the IBM, wherein the received scaling factor is transmitted to the IGM; and switch back to the multi-beam management mode via the IBM from the multi-tier network entity management mode, based on the comparison result, upon transmitting the scaling factor.

19. The non-transitory computer-readable medium of claim 17, wherein the first pre-defined threshold value associated with the physical network environment and the second pre-defined threshold value associated with the virtual network environment are dynamically modified based on:

determining, by the processor, periodically the bandwidth demand value associated with the aggregated bandwidth demand, is within the first pre-defined threshold value associated with the physical network environment and the second pre-defined threshold value associated with the virtual network environment;

determining, by the processor, a beam adjusted value corresponding to the virtual network environment, based on determining the bandwidth demand value is within the first pre-defined threshold value and the second pre-defined threshold value; and modifying, by the processor, at least one of the first pre-defined threshold value and the second pre-defined threshold value based on:

exceeding the bandwidth demand value over the second pre-defined threshold value for allocating the bandwidth, wherein the second pre-defined threshold value is modified to the beam adjusted value; and modifying incrementally the second pre-defined threshold value for each of a pre-defined time, based on the beam adjusted value.

20. The non-transitory computer-readable medium of claim 19, wherein, upon modifying incrementally the second pre-defined threshold value for each of the pre-defined time, the processor is to progressively shift the at least one of the virtual network environment, and a beam associated with the virtual network environment to an adjusted slot of the bandwidth allocation.

* * * * *